US012168533B1

(12) United States Patent
Hinman et al.

(10) Patent No.: US 12,168,533 B1
(45) Date of Patent: Dec. 17, 2024

(54) AUTONOMOUS UNMANNED AIRCRAFT SYSTEM

(71) Applicant: SiFly Aviation, Inc., Monte Sereno, CA (US)

(72) Inventors: Brian L. Hinman, Carmel Valley, CA (US); Bryan K. Brown, Portland, OR (US); Muhammad Mubeen Javaid, Punjab (PK)

(73) Assignee: SiFly Aviation, Inc., Santa Clara, CA (US)

( * ) Notice: Subject to any disclaimer, the term of this patent is extended or adjusted under 35 U.S.C. 154(b) by 0 days.

(21) Appl. No.: 18/416,787

(22) Filed: Jan. 18, 2024

Related U.S. Application Data

(60) Provisional application No. 63/439,720, filed on Jan. 18, 2023.

(51) Int. Cl.
B64U 50/37 (2023.01)
B64U 70/97 (2023.01)

(52) U.S. Cl.
CPC ............ B64U 50/37 (2023.01); B64U 70/97 (2023.01)

(58) Field of Classification Search
CPC .... B64U 50/37; B64U 70/97; B64U 2101/30; B64U 50/19; B64U 2101/00; B64F 1/12; B64C 29/02
See application file for complete search history.

(56) References Cited

U.S. PATENT DOCUMENTS

| | | | |
|---|---|---|---|
| 9,972,212 B1 * | 5/2018 | Sperindeo | G06F 18/22 |
| 10,418,830 B1 * | 9/2019 | Parodi | G05D 1/0202 |
| 10,434,885 B2 * | 10/2019 | Antonini | B64C 39/024 |
| 10,642,272 B1 * | 5/2020 | Parodi | B64U 10/13 |
| 10,735,653 B1 * | 8/2020 | Huang | G06V 10/243 |
| 10,858,097 B2 | 12/2020 | Waters | |
| 11,597,505 B1 | 3/2023 | Hinman et al. | |
| 11,603,219 B2 * | 3/2023 | Ratajczak | B64D 1/22 |
| 11,618,565 B2 * | 4/2023 | Blake | B60L 53/53 701/3 |
| 11,671,888 B2 * | 6/2023 | Kaneda | B64C 39/02 370/331 |

(Continued)

FOREIGN PATENT DOCUMENTS

| | | |
|---|---|---|
| EP | 3095170 A1 | 11/2016 |
| WO | 2016/113766 A1 | 7/2016 |

OTHER PUBLICATIONS

Hinman, Brian L., U.S. Appl. No. 63/276,891, filed Nov. 8, 2021 for Contra-Rotating Electric Helicopter, 60 pages.

(Continued)

Primary Examiner — Medhat Badawi
(74) Attorney, Agent, or Firm — Sunstein LLP

(57) ABSTRACT

A system for landing and charging an autonomous unmanned aerial vehicle (UAV) is disclosed. The UAV comprises a set of battery powered rotors to fly through the air. The UAV further comprises a landing peg that projects beneath the body configured to be received by a socket of a corresponding landing base. The landing base can have a funnel top to make landing easier. The landing peg has a set of power transfer means that connect with power transfer means in the landing base to recharge the batteries of the UAV. The UAV can be guided to land in the landing base by a ring of LEDs on the landing base.

26 Claims, 23 Drawing Sheets

(56) References Cited

U.S. PATENT DOCUMENTS

| | | | | |
|---|---|---|---|---|
| 11,673,690 | B2* | 6/2023 | Dayan | B64U 10/60 244/114 R |
| 11,776,136 | B1* | 10/2023 | Pachikov | B64U 70/92 244/17.23 |
| 11,840,329 | B1 | 12/2023 | Hinman | |
| 11,939,080 | B2* | 3/2024 | Cowden | B64U 80/30 |
| 11,970,287 | B2* | 4/2024 | Thompson | G06V 20/13 |
| 2004/0119631 | A1* | 6/2004 | Sanders | G01S 7/38 342/14 |
| 2012/0261516 | A1* | 10/2012 | Gilliland | G01S 7/4868 356/4.01 |
| 2013/0056230 | A1* | 3/2013 | Lemke | A62C 3/0242 169/44 |
| 2016/0035224 | A1* | 2/2016 | Yang | G08G 5/0069 701/23 |
| 2016/0200207 | A1* | 7/2016 | Lee | B64C 39/024 244/17.23 |
| 2017/0021923 | A1* | 1/2017 | Fisher | B64F 1/12 |
| 2017/0144776 | A1* | 5/2017 | Fisher | B64F 1/24 |
| 2017/0210486 | A1* | 7/2017 | O'Brien | H04N 23/55 |
| 2017/0217323 | A1* | 8/2017 | Antonini | B60L 53/30 |
| 2017/0283090 | A1* | 10/2017 | Miller | B64U 50/39 |
| 2018/0118340 | A1* | 5/2018 | Russo | A01K 59/00 |
| 2019/0106224 | A1* | 4/2019 | Nishikawa | B64U 50/37 |
| 2020/0064135 | A1* | 2/2020 | Lai | G08G 5/0069 |
| 2020/0073385 | A1* | 3/2020 | Jobanputra | G06N 3/08 |
| 2020/0355599 | A1* | 11/2020 | Rodier | G01N 15/1434 |
| 2021/0300547 | A1* | 9/2021 | Stanhope | B64F 1/12 |
| 2021/0300552 | A1* | 9/2021 | Isberg | B64F 1/10 |
| 2021/0385388 | A1* | 12/2021 | Utter | G01S 5/163 |
| 2022/0019970 | A1* | 1/2022 | Williams | B64U 60/50 |
| 2022/0153413 | A1* | 5/2022 | Riccardo | B64D 47/08 |
| 2022/0187827 | A1* | 6/2022 | Graham | B64U 10/13 |
| 2022/0237909 | A1* | 7/2022 | Nurkic Kacapor | G06V 10/82 |
| 2022/0355952 | A1* | 11/2022 | Thompson | B64C 39/024 |
| 2022/0411056 | A1* | 12/2022 | Pratt, Jr. | G05D 1/0094 |
| 2022/0413518 | A1* | 12/2022 | Lee | B64C 39/02 |
| 2023/0167653 | A1* | 6/2023 | Waters | G08G 5/0013 244/114 R |
| 2023/0202663 | A1* | 6/2023 | Palombini | B64D 27/24 701/3 |
| 2023/0202670 | A1* | 6/2023 | Bosma | B64D 1/06 244/195 |
| 2023/0205231 | A1* | 6/2023 | Romar | G05D 1/101 701/2 |
| 2024/0012760 | A1* | 1/2024 | Farhadiroushan | G06F 12/0246 |
| 2024/0090395 | A1* | 3/2024 | Jadhav Siddharth Sunil | B64U 10/13 |

OTHER PUBLICATIONS

Chittoor et al.; "A Review on UAV Wireless Charging: Fundamentals, Applications, Charging Techniques and Standards", Digital Object Identifier, Access, vol. 9. May 3, 2021, 32 pages.

Lange et al.; "A Vision Based Onboard Approach for Landing and Position Control of an Autonomous Multirotor UAV in GPS-Denied Environments", Universita degli Studi di Roma La Sapienza, IEEE Xplore, downloaded Jan. 11, 2010, 6 pages.

Ling, Kevin, "Precision Landing of a Quadrotor UAV on a Moving Target Using Low-cost Sensors", thesis presented to University of Waterloo for Master of Applied Science in Mechanical Engineering degree, Waterloo, Ontario, Canada 2014, 69 pages.

Nowak, Ephraim, "Autonomous Navigation of an Unmanned Aerial Vehicle Using Infrared Computer Vision", thesis submitted to University of British Columbia for Master of Applied Science in Graduate Studies (Mechanical Engineering), Okanagan, British Columbia, Canada, Apr. 2018. 136 pages.

Borowczyk et al., "Autonomous Landing of a Quadcopter on a High-Speed Ground Vehicle", Polytechnique Montreal and GERAD, Montreal, QC H3T 1J4, Canada, 20 pages.

Stone, Thomas, "Prescision Landing and Loiter", Copyright 2024, ArduPilot Dev Team, (https://ardupilot.org/copter/docs/precision-landing-with-irlock.html), printed Apr. 23, 2024, 5 pages.

* cited by examiner

BILL OF MATERIALS, PPT $\Phi_2$ WPT DC-DC CONVERTER

| Devices | Component Description |
|---|---|
| (a) Inverter | |
| $S_{1,2}$ | GaN Systems GS66508B, 650 V GaN FET |
| Gate Driver | Texas Instruments LMG1025 |
| $L_{1a}, L_{1b}$ | 4.33 µH, Ferroxcube E22/6/16-4F1 x 2 |
| $L_{2a}, L_{2b}$ | 1.085 µH, Fair-rite 67 EEQ25/16 |
| $C_{2a}, C_{2b}$ | 127 pF, C0G, 3 kV |
| $C_{1a}, C_{1b}$ | $S_{1a,1b}$ $C_{oss}$ + STPSC406B $C_j$ + 136 pF, C0G, 1 kV |
| (b) Rectifier | |
| $D_{1-4}$ | STMicro STPSC406B-TR x 2, 650 V SiC Schottky |
| $L_{zvs}$ | 3.7 µH, Fair-rite 67 EEQ25/16 |
| (c) Coils | |
| $L_{pri}, L_{sec}$ | 6.25 µH, AWG 10, 6 turns, Q ≈ 700 |
| $C_{res1}, C_{res2}$ | 88 pF, C0G, 3kV |

*FIG. 9B*

(Prior Art)

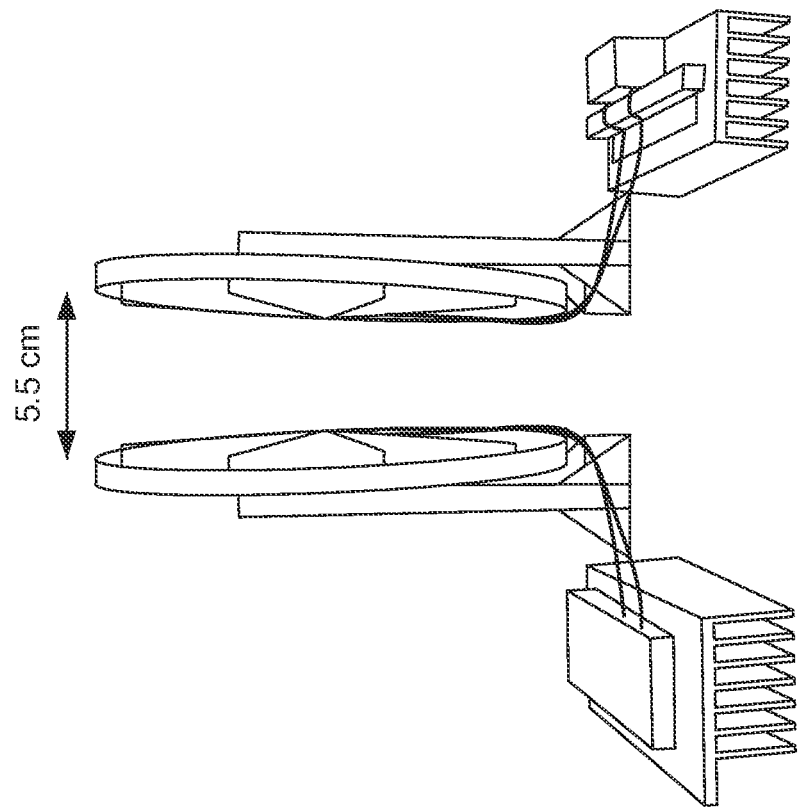
*FIG. 9C*
(Prior Art)
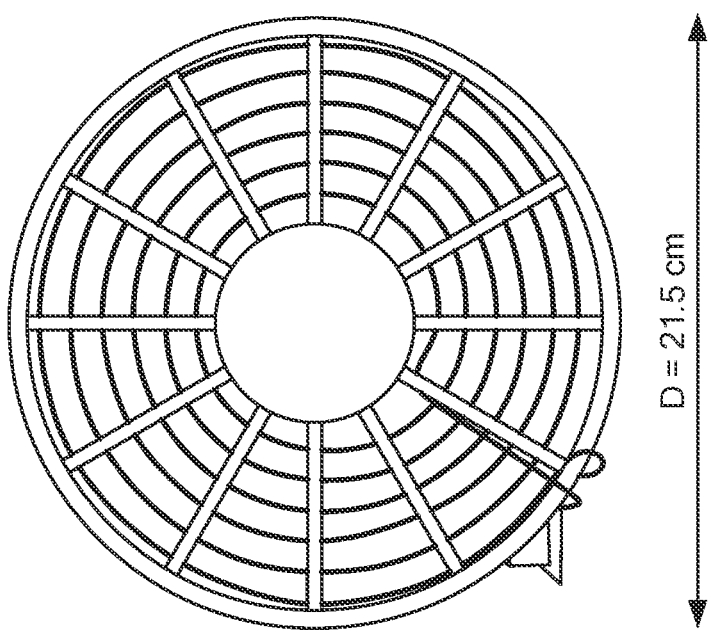

AUTONOMOUS UNMANNED AIRCRAFT SYSTEM

RELATED APPLICATION

The present application claims the benefit of provisional application Ser. No. 63/439,720, filed Jan. 18, 2023, which is hereby incorporated herein by reference in its entirety.

TECHNICAL FIELD

The present invention relates to unmanned aircraft systems, and more specifically, to autonomous unmanned rotorcraft and supporting ground equipment.

BACKGROUND ART

An Unmanned Aerial Vehicle (UAV), commonly known as a drone, is an aircraft without a human pilot, crew or passengers onboard. UAVs are a component of an Unmanned Aircraft System (UAS), which includes subsystems such as a ground-based controller, a wireless communications link, and a refueling/recharging station. The flight of a UAV may operate under the remote control of a human operator, as a Remotely-Piloted Aircraft (RPA), or with varying degrees of autonomy, such as a basic autopilot, up to fully autonomous aircraft that have no provision for human intervention.

As with all aircraft, UAVs can be classified as either conventional fixed-wing aircraft, whereby takeoffs and landings occur through acceleration along a generally horizontal path, or vertical lift aircraft, whereby takeoffs and landings occur from a fixed position, utilizing vertical thrust methods. The advantage of conventional fixed-wing aircraft is the ability to fly at higher speeds, over longer distances, with greater aerodynamic efficiency. The disadvantage of conventional fixed-wing aircraft is the need for runways or other horizontal tracks, to initiate takeoffs, and allow for non-destructive landings. The advantages of vertical lift aircraft are the ability to operate with minimal ground-based infrastructure, hover over a target for an extended period, and potentially automate the refueling/recharging process, as this application will later describe. The disadvantage of vertical lift aircraft are generally reduced speed, range and aerodynamic efficiency, compared with fixed-wing aircraft. These disadvantages have been overcome with directed-thrust (typically tilt-rotor) aircraft under development, notably those targeting human transportation. Directed-thrust aircraft are inherently complex and costly designs, however, limiting their use to high-value applications.

Another delineation of UAVs (drones) is the method of generating propulsion. During the first 100 years of aircraft development, most aircraft were propelled through the combustion of fossil fuels, whether in an Otto cycle, Diesel cycle or Brayton cycle engine, to generate shaft power to turn a propeller, or to directly accelerate air to a high velocity. Electric propulsion emerged over the last 20 years, as advancements in inertial sensors, motors, batteries, and computers made it possible to develop low-cost UAVs with adequate endurance to meet a range of applications. Hybrid UAVs have been developed To address the endurance issue, there has been developed the hybrid UAV, which couples an internal combustion engine to an electrical generator to provide the electric power for the electric motors and onboard computers. One advantage of pure-electric UAVs, however, typically powered by lithium-ion batteries, is the opportunity to automate the recharging process, as will be described in this application.

Drones have found widespread market adoption, addressing needs in consumer, commercial and government applications. The mostly widely adopted drone is the ubiquitous quad copter. On the low end of the market, consumer quad copters are sold for less than $100, becoming a popular toy for children. At the other extreme, the US and foreign militaries operate turbine-propelled UAVs, such as the fixed-wing General Atomics MQ-9A Predator B, with a take-off weight of more than 10,000 pounds, and a unit cost of more than $14M. Between the two extremes, there are many applications that will require new UAV and UAS hardware platforms to be developed. For example, the US Department of Homeland Security has an urgent need to protect the southern border, with more than 1.6 million border apprehensions in 2021, a dramatic increase from prior years. Drones are an obvious way to augment the human role of securing the borders. While high-end drones have adequate range and endurance, the operating cost is much too high to be a scalable solution. Existing consumer and commercial drones lack the range and endurance to meet the requirement. Certainly, companies like Anduril have demonstrated new UAS architectures with great promise, though the realization of a truly autonomous UAS, with adequate range and endurance, has yet to be realized.

A truly autonomous UAS would have the ability to operate for extended periods of time without human intervention. As artificial intelligence technology continues to advance, this is certainly feasible from a software perspective. From a hardware perspective, it means that the UAS would need instrumentation to be able to autonomously takeoff and land, provisions to allow autonomous charging or refueling while landed, and include docking features to ensure aircraft stability while landed, even when inclement weather that may preclude flight operations. Each of these three requirements require special design considerations.

Precision landing of a UAV is a basic requirement of a UAS, as autonomous charging and docking are proximate to a landing station. Global Navigation Satellite Systems (GNSS), including the United States Global Positioning System (GPS), have become primary navigation aids for most UAVs. Using standard accuracy GNSS receivers, the position of a UAV can be determined within about 2 meters in latitude and longitude, and 4 meters in altitude. High precision GNSS systems dramatically improve the location accuracy, though they require ground-based GNSS reference stations which are not widely available. Consequently, autonomous landings of UAV require additional instrumentation. The prior art includes two general categories of precision landing systems: (a.) image-based identification of a pattern on the landing base, utilizing a visible light camera onboard the UAV, and (b.) infrared light based identification of infrared emitters on the landing base, using an infrared-sensitive camera onboard the UAV. Both solutions are now commercially available.

A precision landing scheme based upon image identification was first described by Lange et al, at the International Conference on Advanced Robotics in 2009. A set of concentric circles served as a visual fiducial system, allowing a multi-rotor UAV to land in a "GPS-denied environment." Several researchers published improvements to the basic method over the decade to follow. Ling described a precision landing system in his Master's thesis at the University of Waterloo in 2014. He used AprilTags, a low-resolution QR-type pattern developed by the University of Michigan, as a visual fiducial to guide a drone, equipped with a video camera, to achieve a precision landing upon a moving platform. Subsequently, Borowczyk et al published a paper in the International Federation of Autonomous Control in 2017, expanding upon the ideas of Ling. Further improvements by Wudden et al were described in December 2019. With all the precision landing schemes based upon image identification, the limitations include: (1.) the need for illumination of the pattern, making nighttime operation impossible without a light source, (2.) the inability of the system to work in dense fog conditions, and (3.) the trade-off between range and landing accuracy being limited by camera resolution.

Precision landing methods based upon infrared emitters have also been described by several research groups. In 2015, T. Stone of Georgia Tech developed the first precision landing system using an IR beacon on the ground, and a low-cost IR-sensitive camera on the drone. Stone modified a PIXY computer vision camera, adding an IR filter to block most of the visible light that would otherwise cause sensor saturation. The system worked well, allowing precision landings with an accuracy between 5 cm and 30 cm. With this technical success, Stone founded IR-LOCK to commercialize the technology. He subsequently raised money through a Kickstarter program, and began sales of the IR beacon and modified PIXY camera, controlled with open source ArduPilot software he developed. In 2018, E. Nowak described a similar system in his Master's thesis at the University of British Columbia. As the ground-based IR beacon, he used a high-power infrared radiator designed for hearing assistance systems. Under indoor lighting conditions, Nowak successfully landed a UAV within a 40 cm×40 cm area. The primary issue reported with the use of precision landing systems based upon infrared beacons is their limited range, particularly in outdoor lighting conditions. As an example, the IR-LOCK system specifies the use of an additional LiDAR range finder, working in concert with GPS navigation, for the infrared system to secure a pilot signal from the beacon, and thus begin a controlled descent. The range limitation comes from two signal processing issues that the various researchers had not identified, namely: (a.) Frequency-domain segregation of the IR beacon, similar to how a TV remote control works, is not possible when using a 30 fps video camera, and (b.) High-dynamic range is necessary to identify the IR beacon from background signals, particularly in high sunlight conditions, yet the dynamic range of the digital image sensor used in the PIXY camera, for example, is limited to 60 dB.

Autonomous charging of electrically propelled UAVs has received attention within the industry and academia. One method to charge a UAV battery is through wireless power transfer, which has become a popular method to charge the batteries of small consumer devices, such as mobile phones. In U.S. Pat. No. 10,858,097, Waters (WiBotics) describes a method of wireless power transfer to a UAV wherein a first signal through a transmitter coil allows the detection of the UAV within proximity, the UAV uses the first signal to navigate its receiving coil closer to the transmitter coil, and then the transmitter initiates a second signal of higher power than the first, transferring energy to the UAV battery charging circuit. WiBotics commercialized systems based upon this method, both for unmanned terrestrial and aerial vehicles. Others have introduced similar wireless charging solutions for UAVs, including the Israeli company, Powermat. To summarize five years of research and development in the field, a paper entitled, "A Review of UAV Wireless Charging: Fundamentals, Applications, Charging Techniques and Standards," was published by Chittoor et al in May 2021. They describe five distinct wireless technological methods, including: capacitive, inductive, magnetic resonant, LASER, and microwave. Each method has advantages and disadvantages relative to the others. All wireless methods, however, are limited in both range and efficiency. While in 2019, Global Energy Transmission Corp. demonstrated wireless charging of a drone in flight, from a ground-based power source, the short range and limited efficiency render the concept as fundamentally impractical. Thus, the only practical wireless charging solutions involve close proximity with a landed UAV.

The other method of charging UAVs is using conductive electrical contacts. The advantage of this method is avoiding the losses inherent with wireless systems. Whereas wireless systems have a maximum efficiency of 95%, direct conductive systems have efficiencies greater than 98%. One commercially available system is offered by SkyCharge GmbH of German. They created a "charging carpet," consisting of alternating regions of positive and negative (or ground) potential, on a landing pad. On the drone, small contact plugs project from beneath the aircraft. Upon landing, the weight of the drone causes some of the contact plugs to make an electrical connection with a positive potential, while other contact plugs make an electrical connection with a negative (or ground) potential. Power is transferred from the charging carpet, though the contact plugs on the drone, into the onboard battery system. The concept was disclosed through EP 3095170A1 in January 2015, and similarly through WO 2016/113766A1 in July 2016. There are two key issues with the charging carpet approach. First is the direct exposure of the electrical contacts, which can create an electrocution risk for high-battery voltages typical of large drones, and the possibility of unintentional or intentional shorting of the power from a metal foreign object. The second issue is the charging carpet being a flat surface, it does not secure the drone position during inclement weather. If the charging carpet were in an elevated position to avoid human tampering, for example, the drone could blow off the charging carpet during high wind conditions, falling to the ground and breaking.

Another concept was disclosed by Antonini et al (Telecom Italia) in U.S. Pat. No. 10,434,885. Addressing the issue of exposed contacts, they introduced the concept of a landing zone 20 having a plurality of substantially funnel-shaped centering housings 22, which mate with a "plurality of projections" from the UAV, as shown in FIG. 1 (Prior Art). The funnel-shaped centering housings 22 have a top surface of the funnel 22A and a tube that projects downward 22B. Within the centering housing are electrical contacts "configured to embrace a projection" of the UAV. There is no evidence that the system has been fully developed or commercialized, though the scheme has practical issues. Of note, the need to align a plurality of projections and centering housings, to permit insertion and subsequently charging, requires navigation of the UAV over two axes of translation, and three axes of rotation. The inventors don't seem to recognize the issue, as a detailed description of the landing sequence is not described. Moreover, the description specifically says, "According to the present invention the number of funnel-shaped housings (and thus the number of supporting feet) is greater than one." Ironically, a single funnel-shaped housing and a single foot provides a realistic framework to address the alignment issue.

In the provisional U.S. patent application No. 63/276,891, filed Nov. 8, 2021, and the subsequent non-provisional U.S. patent application Ser. No. 17/983,111, filed Nov. 8, 2022, the inventor of the present invention describes the "Contra-Rotating Electric Helicopter," a simple and efficient design for an electrically propelled helicopter using a single drive motor to turn two rotors in contra-rotation. The first embodiment of the Contra-Rotating Electric Helicopter is illustrated in FIG. 2 (Prior Art), having a single landing peg at the base of the central cylinder containing the electronics and battery modules. This embodiment is illustrated in relation to a landing base designed to accommodate the landing peg. The inventor describes the use of "navigation methods such as augmented GPS, radar and video" to allow the landing of the helicopter within the landing base. In the current patent application, the inventor details specific methods for the autonomous landing and takeoff of the UAV, the means for autonomous charging of the UAV, and methods to coordinate a plurality of such UAVs to operate as a UAS.

Summary of Embodiments

In accordance with one embodiment of the present invention, there is provided an autonomous unmanned aerial vehicle. In this embodiment, the aerial vehicle includes a body; a set of vertical lift rotors rotatably mounted to the body; a corresponding set of electric motors mounted to the body and coupled to the set of vertical lift rotors; a set of rechargeable battery modules mounted to the body and configured to be electrically coupled to the set of electric motors; a single landing peg projecting beneath the body, the landing peg configured to be received by a socket of a corresponding landing base; and electrical power in-transfer means, disposed on the landing peg and electrically coupled to the set of battery modules, and configured to transfer electrical power from the corresponding landing base. Optionally, the landing peg has a circular cross section and a vertical extent that is substantially free of any radial projection therefrom. Also optionally, the landing peg is mechanically articulated for retraction into the fuselage of the aerial vehicle, so as to reduce aerodynamic drag while in flight. As a further option, the landing peg includes, at an upper end thereof, a tapered-shaped section configured to mate with a funnel shaped entryway of a socket of a corresponding landing base. As a further option, the aerial vehicle includes a set of digital video cameras mounted to the body and covering a 360-degree field of view, and onboard circuitry, coupled to the set of cameras, configured to compress and store the store video data from the set of cameras. As yet another option, the electrical power in-transfer means is configured to be inductively coupled to a power out-transfer means disposed inside the socket of the landing base. Alternatively, the electrical power transfer means is a plurality of electrical contacts on the landing peg configured to connect to a corresponding plurality of contacts in a socket of the corresponding landing base.

In another embodiment, the invention provides a landing base for an autonomous unmanned aerial vehicle according to claim 1. In this embodiment, the invention includes a socket configured to receive therein the landing peg from the autonomous unmanned aerial vehicle; a power out-transfer means disposed inside the socket and configured to transfer electrical power to the aerial vehicle when the landing peg from the aerial vehicle is inserted into the socket; an electrical power source coupled to the landing base; and a charge controller configured to control transfer power to the aerial vehicle in accordance with a charge profile appropriate for the set of battery modules. Optionally, the embodiment further includes a funnel-shaped entryway coupled to the socket to guide the landing peg into the socket. As a further option, wherein the aerial vehicle further includes (a) a set of digital video cameras mounted to the body and covering a 360-degree field of view, and onboard circuitry, coupled to the set of cameras, configured to compress and store the store the video data from the set of cameras, and (b) a video data transmitter, the landing base further includes a video data receiver configured to receive video data from the video data transmitter. As yet another option, the power out-transfer means is configured to be inductively coupled to the power in-transfer means of the aerial vehicle. Optionally, the power out-transfer means includes a plurality of electrical contacts inside the socket configured to make electrical connection with a corresponding plurality of contacts constituting the power in-transfer means of the aerial vehicle.

In another embodiment, the invention provides an autonomous unmanned aircraft system. This embodiment includes: a plurality of aerial vehicles as described above, wherein each aerial vehicle has a flight control system and a wireless data transceiver coupled to the flight control system; a plurality of landing bases, each landing base having a socket configured to receive therein the landing peg from a selected one of the autonomous unmanned aerial vehicles; and a mission control system configured to communicate with the data transceiver of each of the aerial vehicles, so as to orchestrate the activities of the set of aerial vehicles. As a further option, (i) each aerial vehicle further includes a computer system configured for artificial intelligence processing and for implementing multi-party computing with the computer system of each of the other aerial vehicles, and (ii) the mission control system is implemented distributively via multi-party computing of the computer systems of the set of aerial vehicles. As a further option, each aerial vehicle has a flight control system and a wireless data transceiver coupled to the flight control system; and the power out-transfer means of each landing base is configured to be inductively coupled to the power in-transfer means of the aerial vehicle. Optionally, the mission control system is a ground-based computer system.

In another embodiment, the invention provides a precision landing system for an autonomous unmanned aerial vehicle. This embodiment includes a set of infrared light emitters mounted in proximity to an established landing location; a set of oscillators coupled to the set of infrared light emitters; a plurality of infrared photodetectors mounted on the aerial vehicle, said photodetectors having distinct orientations with respect to a central axis through the aerial vehicle; a set of analog circuits within the aerial vehicle, coupled to the plurality of photodetectors, the circuits configured to process signals received by the plurality of photodetectors; a set of analog-to-digital converters, coupled to the set of analog circuits, converting the processed analog signal from the plurality of photodetectors into digital signals; a set of central processing units, coupled to the set of analog-to-digital converters, interpreting the digital signals, and instructing the movement of the aerial vehicle to land in proximity of the landing position. Optionally, the plurality of infrared photodetectors mounted on the aerial vehicle are within a rotating frame of reference, whereby the movement provides enhanced information for the set of central processing units to estimate the landing position. Also optionally, the set of infrared photodetectors include filters to reduce the reception of visible light energy. As a further option, the set of oscillators is replaced by a set of pseudo-random sequence generators. In addition as an option, a plurality of infrared light emitters are mounted around the perimeter of the designated landing position.

In some embodiments, a contra-rotating electric helicopter serves as the UAV. The UAV includes a single landing peg projecting below its central mass. A landing base is designed to accommodate the UAV. The landing base includes a lead-in funnel, surrounding a central socket to mate with the landing peg. In the landed state, the UAV is mechanically stable, as the peg and socket nest with sufficient depth and tolerance to ensure that the UAV cannot tip over or become dislodged. Some embodiments include roller bearings in the funnel, such that the lower surfaces of the UAV do not wear while spinning-up for take-off, and spinning-down after landing. While landed, having a low-friction interface, wind may cause the UAV rotors to begin movement, even without power applied to the drive motor. In some embodiments, the UAV drive motor controller is configured for braking, to prevent this movement.

The interface between the landing peg and base socket allows autonomous charging of the UAV. In some embodiments, the landing peg includes conductive rings to mate with spring-loaded brushes within the landing socket. The direct electrical connection of the conductive rings and the brushes allows the coupling of DC power from the landing base into the battery modules within the UAV, facilitating battery charging according to the required current and voltage profile. In these embodiments, the insertion of the landing peg into the base socket resembles the insertion of a phone plug into a phone jack, a simple and effective concept perfected more than a hundred years ago for telephone systems.

In other embodiments of the UAV and landing base, a coil within the landing peg becomes closely coupled with a coil within the landing socket, in effect forming a transformer circuit. Efficient wireless coupling allows AC power to be transferred from the landing base into the UAV. For these embodiments, the UAV includes a rectifier circuit, to convert the AC power into DC power, and a charge controller, to convert the DC power into the required time-varying voltage and current necessary to charge the onboard battery modules.

Landings are made possible with a precision landing system. An infrared (IR) beacon within the landing base signals IR detectors within the UAV, as to the precise position of the landing funnel and sleeve. In some embodiments, a set of IR LEDs form a ring around the perimeter of the landing funnel. To provide discrimination of the IR LEDs relative to sunlight, which presents an interference source, a set of oscillators or pseudo-random generators flash the IR LEDs. Onboard the UAV, a set of IR sensors, such as photodiodes or phototransistors, receive the signal emanating from the IR beacon. The IR sensor signals are amplified and processed, either with a band-pass filter or a pseudo-random correlator. Looking toward the ground, a low-resolution IR image is formed, utilizing a set of narrow-beam IR detectors aimed at distinct angles relative to the primary axis through the UAV. For embodiments wherein the UAV is the contra-rotating electric helicopter, the IR detectors are within a constantly rotating frame of reference. This movement is used advantageously, to form concentric rings of IR light intensity signals sampled over time. With knowledge of the azimuth orientation, the computer onboard the UAV can ascertain the position of the UAV with respect to the landing beacon. Using cyclic and thrust control, the UAV autonomously descends and lands within the landing base.

The UAV includes wireless communication capabilities. While in flight, the UAV uses a long-range wireless service, such as that provided by the 4G or 5G cellular network. After landing, some embodiments of the UAV switch to a local wireless service, such as Wi-Fi. Generally, the long-range wireless service provides less bandwidth than the local wireless service. In some embodiments, the long-range service provides a persistent connection from the UAV to a terrestrial controller. The terrestrial controller may be manned or autonomous, directing the general or specific activities of the UAV. The UAV provides information to the ground-based controller, which may include video, audio, and other sensor data, though in some cases the UAV includes adequate computing power to interpret the raw data, providing high-level information to the ground-based controller. During flight, some UAV embodiments store a large amount of raw data, such as 360-degree UHD video. While the ground-based controller has access to a subset of this data while the UAV is in flight, the UAV will wait until landed to transfer the bulk of the data collected during its mission. In such embodiments, the local wireless service provides a means to transfer a large amount of data to a mass storage medium, while the UAV is nested within the landing base and charging.

A basic autonomous UAS is formed with a single UAV, a single landing base, and a wireless communication service such as 5G. More advanced autonomous UAS include a multiplicity of UAV, a multiplicity of landing bases, a robust wireless communication network, and a ground-based controller to coordinate the activities of a swarm of UAV. Whereas an individual UAV will require charging for some fraction of the time, a group of UAVs can always be airborne, working together to complete required flight tasks. Depending upon the application, an advanced autonomous UAS may operate over a large geographic area, with continuous flight operations occurring at both day and night, performing complex tasks without the need for human intervention.

BRIEF DESCRIPTION OF THE DRAWINGS

FIG. 9B is a reference table describing the exemplary wireless charging circuit of FIG. 9A.
FIG. 9C is a diagram of prototype coils.

DETAILED DESCRIPTION OF SPECIFIC EMBODIMENTS

Definitions. As used in this description and the accompanying claims, the following terms shall have the meanings indicated, unless the context otherwise requires:

A "set" includes at least one member.

Figure 1:
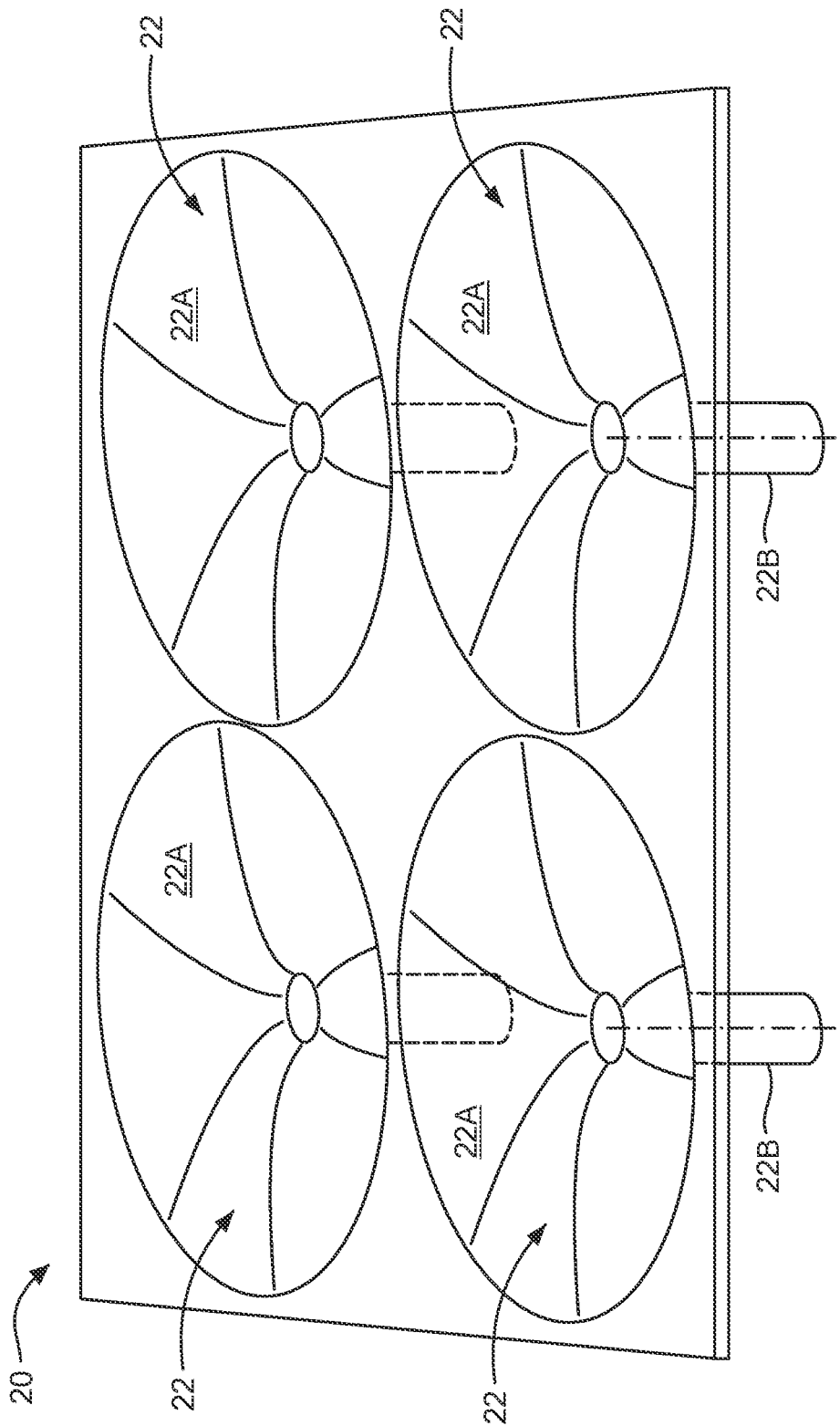
FIG. 1 is a diagram of a charging platform.
Figure 2:
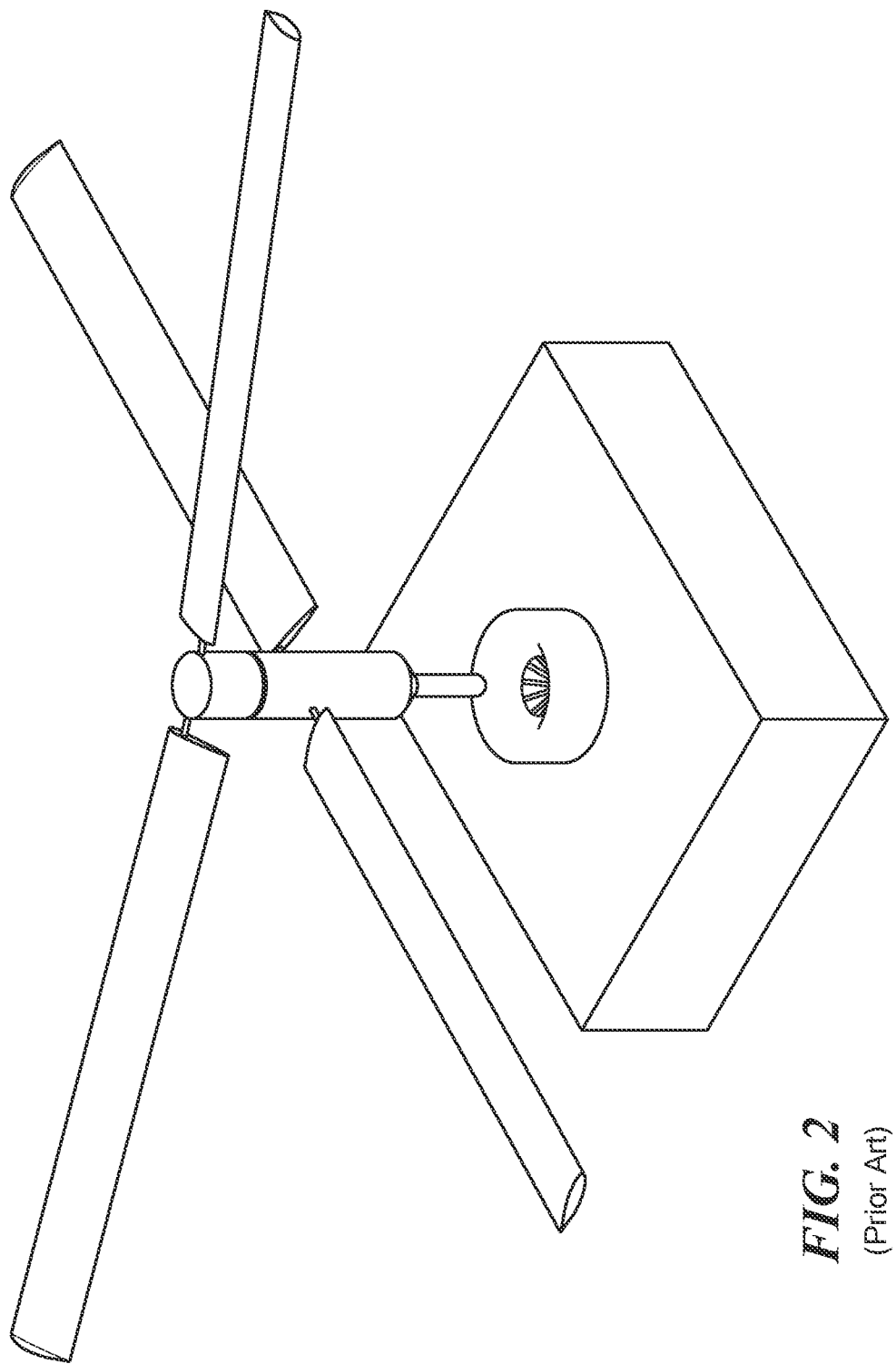
FIG. 2 is a diagram of a contra-rotating electric helicopter.
Figure 3:
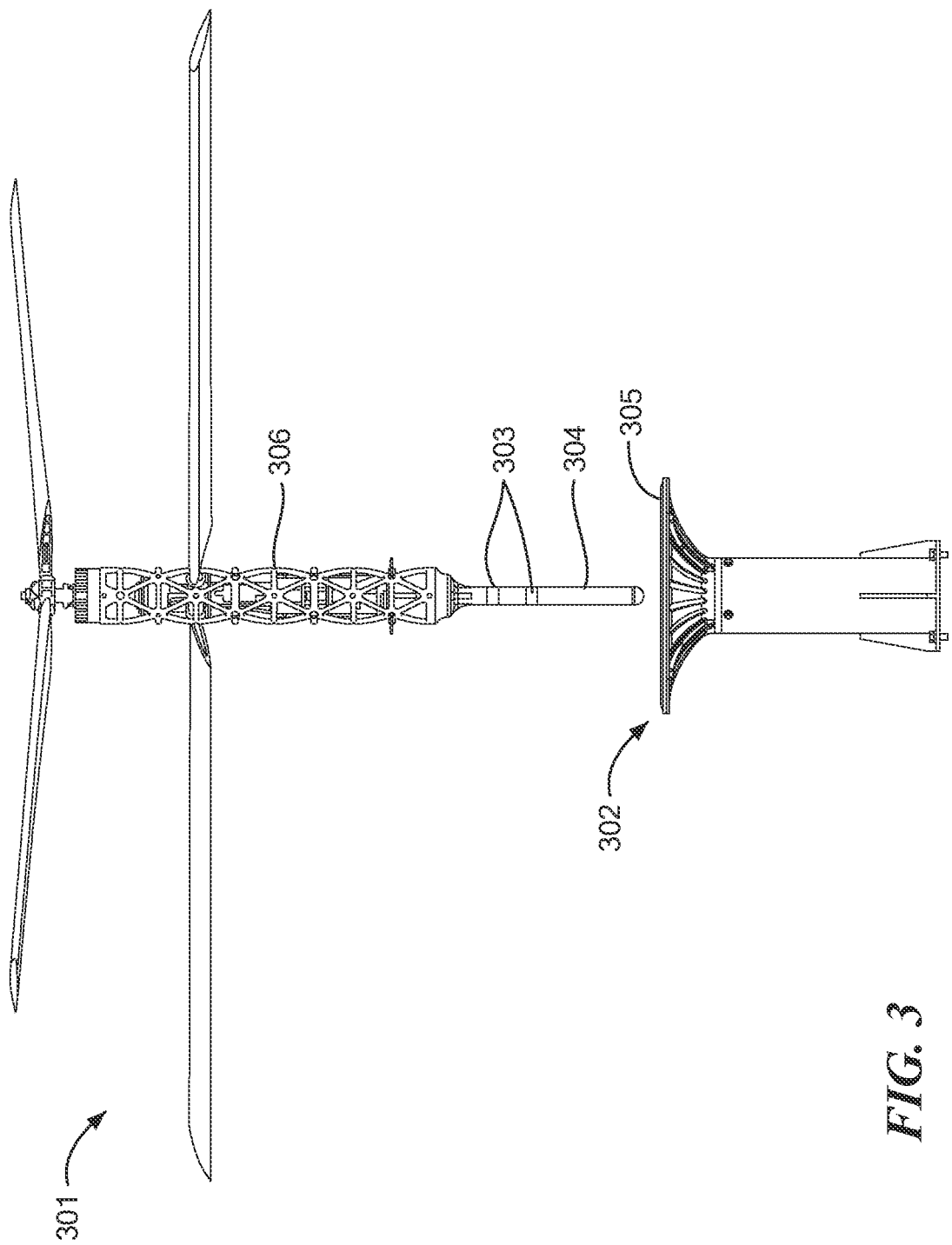
FIG. 3 is an isometric view of an Autonomous UAV 301 hovering over a landing base 302 in accordance with one embodiment of the invention.

One embodiment of the Autonomous Unmanned Aircraft System includes a Contra-Rotating Electric Helicopter shown in FIG. 2, such as one described in U.S. patent application Ser. No. 17/983,111. Improvements to the design include provisions for either conductive or wireless charging, and an array of IR sensors and processing circuitry, enabling precision landings of the UAV within a landing base. FIG. 3 is an isometric view of an Autonomous UAV 301 hovering over a landing base 302 in accordance with one embodiment of the invention. The improved UAV 301 is shown hovering over the improved landing base 302, which is equipped with conductive charging and an infrared beacon system. The conductive rings 303 shown on the landing peg 304 of the UAV are designed to mate with spring-loaded brushes within the sleeve of the landing base 302. Wires connecting the conductive rings to the onboard battery modules allow the highly efficient charging of the battery modules.

In landing base 302, a set of IR LEDs form a ring around the landing funnel 305. From circuitry within the landing base, the IR LEDs are flashed at a rate of 10 kHz. In other embodiments, the flash rate is various other flash rates. The embodiment of the UAV illustrated in FIG. 3 utilizes clear polycarbonate plastic for the lower tapered section of aircraft, between the isogrid truss cylinder 306 forming the body of the UAV, and the landing peg shown below it. The concave surface around the upper circumference of the tapered section serves as the rolling surface against spherical rollers within the landing base. The area between the rolling surface of the UAV and the landing peg acts as a window for IR radiation to reach an IR receiver board mounted inside the domed section. In the illustrious embodiment, the IR receiver board includes four IR photodiodes, mounted such that each has a distinct angle of reception relative to the central axis of rotation for the UAV.

Other embodiments of the UAS include a Rotorcraft Optimized for Forward Flight. On example of a rotorcraft optimized for forward flight is disclosed in U.S. patent application Ser. No. 16/860,370. This UAV architecture offers excellent aerodynamics in forward flight, and a horizontally disposed fuselage that remains in a stationary frame of reference, unlike the Contra-Rotating Electric Helicopter, wherein the main body of the aircraft and the landing peg are in constant rotation. Some embodiments of the Rotorcraft Optimized for Forward Flight include a fixed landing peg that extends below the central portion of the fuselage. As with the prior embodiment, the landing peg is designed to mate with the landing base. Other embodiments of the UAV include provisions to retract the landing peg while in flight, so as to reduce the effect of aerodynamic drag. The retraction of the landing peg is similar to the retraction of the landing gear on an airplane. One means of retracting the landing peg is using a linear actuator in a telescoping mechanism. With one or more telescoping segments, the landing peg articulates vertically, becoming embedded within the volume of the fuselage during forward flight. In other embodiments, the landing peg is coupled to a pivoting gear in the lower portion of the fuselage. Articulated by an electric motor on a worm gear, the landing peg retracts within the fuselage, in a roughly horizontal position, to minimize drag during forward flight. For landing, the flight control computer commands the lowering of the landing peg, into vertical orientation, by rotating the pivoting gear through roughly 90 degrees of rotation. Further optional features of the embodiments include microswitches to indicate when the landing peg is in the fully down and fully up positions, cover doors on the lower surface of the fuselage to improve streamlining, and a locking mechanism to ensure that the landing peg does not move from the fully down and fully up positions.

Figure 4A:
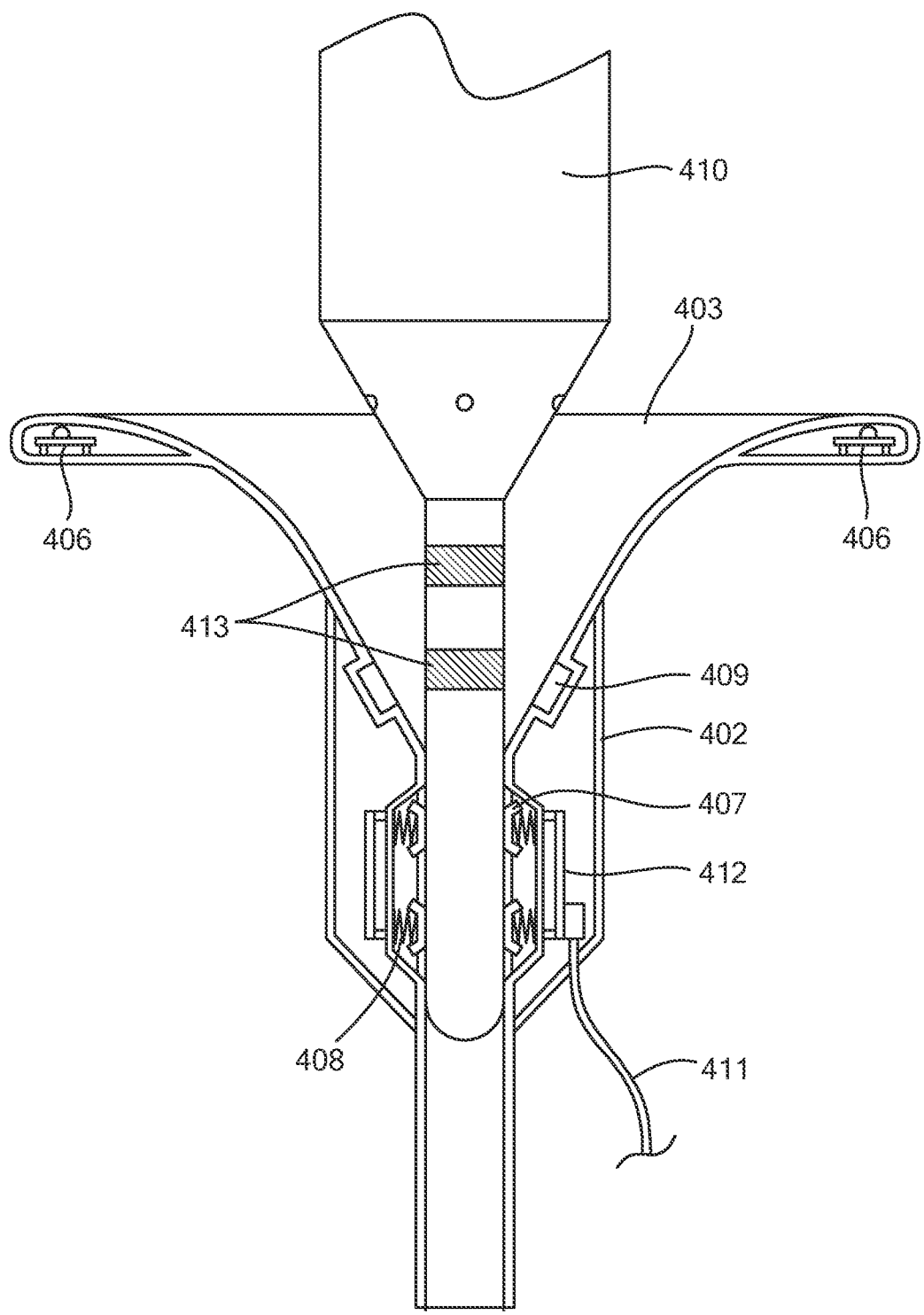
FIG. 4A is a Cross-section of UAV 301 partially engaged with the landing base 302.
Figure 4B:
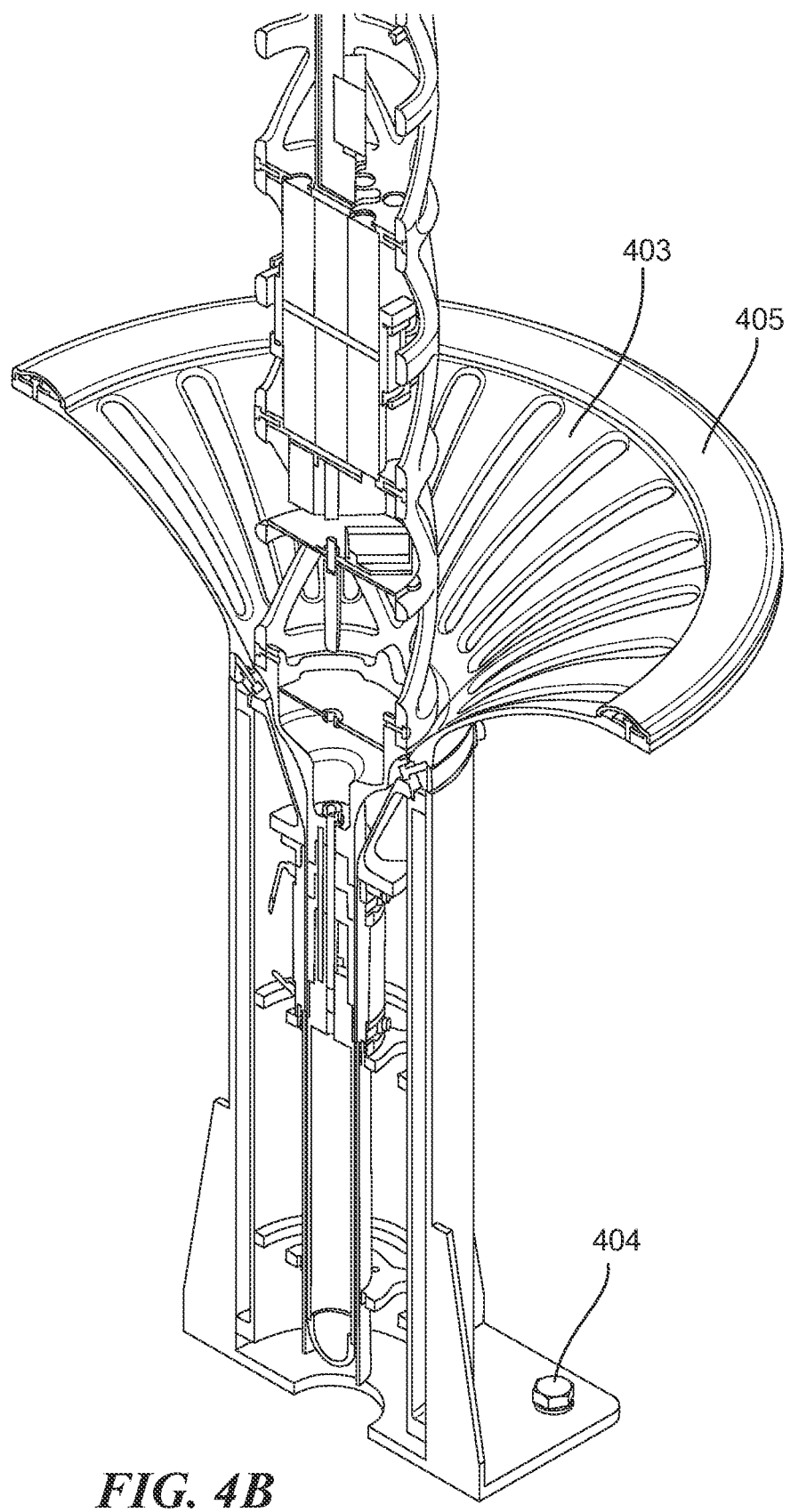
FIG. 4B is a perspective cross-sectional view of UAV 301 engaged within the landing base 302.
Figure 4C:
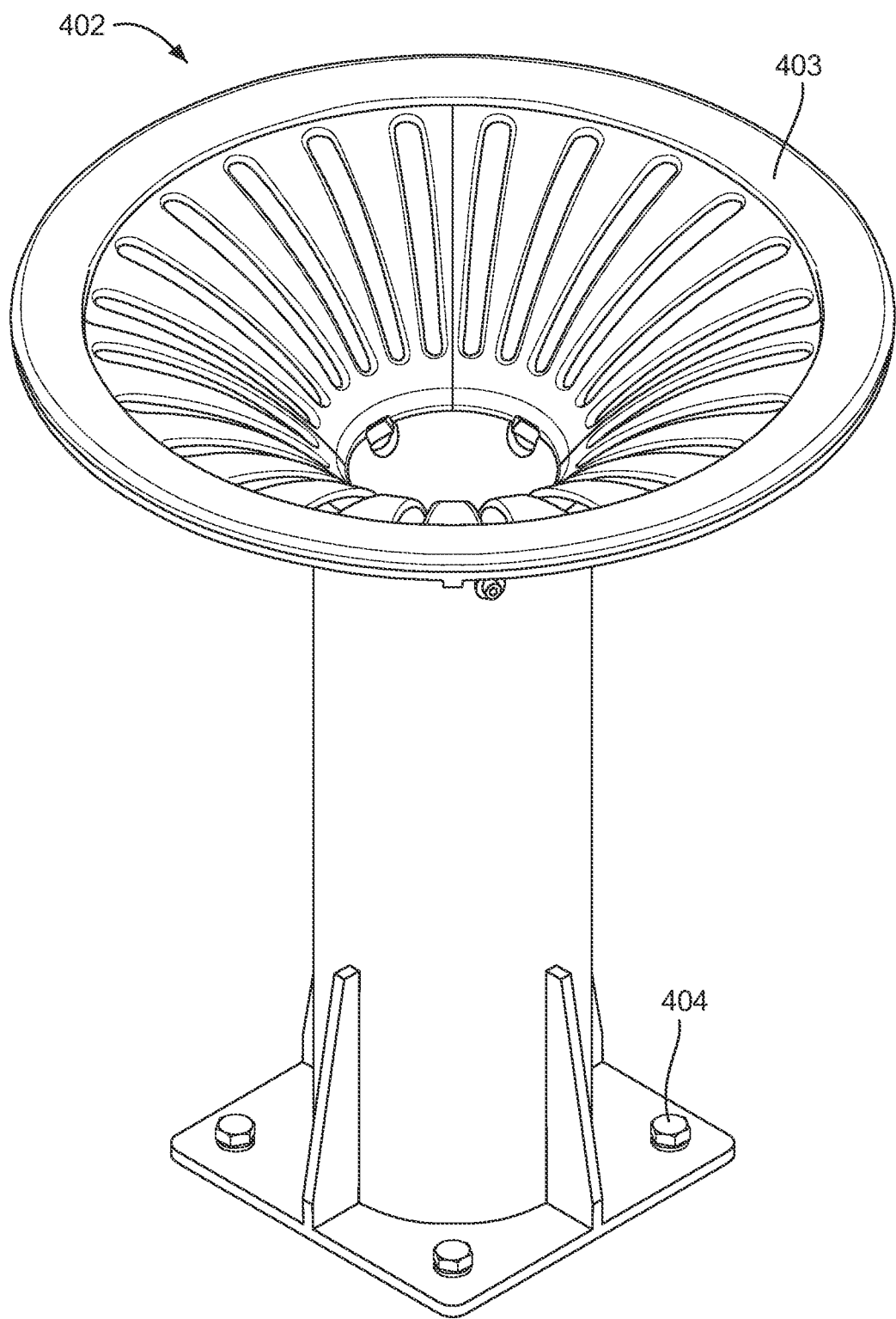
FIG. 4C is a perspective view of landing base 302.

FIGS. 4A, 4B, and 4C illustrate embodiments of a landing base 402 with conductive charging capability. A feature of the landing base is the funnel-shaped surface 403 leading to the landing sleeve. As shown in FIGS. 4B and 4C, the exemplary landing base is mounted to a horizontal surface using bolts 404. In some embodiments, the surface is a concrete slab on the terrain. In other embodiments, the mounting surface is a metal weldment to attach the landing base to an elevated tower. Within the landing base, a set of IR LEDs 406 form a ring 405 around the periphery of the funnel surface. The ring of LEDs are mounted to printed circuit boards, and they are covered with clear polycarbonate plastic for weatherproofing. In some embodiments, each LED emits 300 mW/sr of radiant energy, having a center wavelength of 940 nm, and a half-power beamwidth of +/−30 degrees. Within the landing sleeve are a set of electrical contact brushes 407, three for the positive charging potential, and three for the ground charging potential. In these embodiments, each set of brushes shares a garter spring 408, which hold the brush contacts to protrude slightly beyond the wall of the landing sleeve. When the landing peg of the UAV is inserted within the landing sleeve, the contact brushes retract, though they maintain a force against the wall of the landing peg in accordance with the choice of the garter spring. Rollers 409 can help guide landing peg 410 further into the landing base 402. When the landing peg is fully seated within the landing sleeve, the contact brushes provide an electrical connection with the conductive rings of the landing peg. As the landing peg 410 descends into the landing base 402, the electrical contacts 413 will line up with the contact brushes 407, forming an electrical connection. Once this electrical connection is established, a charge controller within the landing base can begin the controlled transfer of energy into the battery modules of the UAV via charging PCB 412 and power cable 411, in accordance with various parameters of the battery modules.

Figure 5:
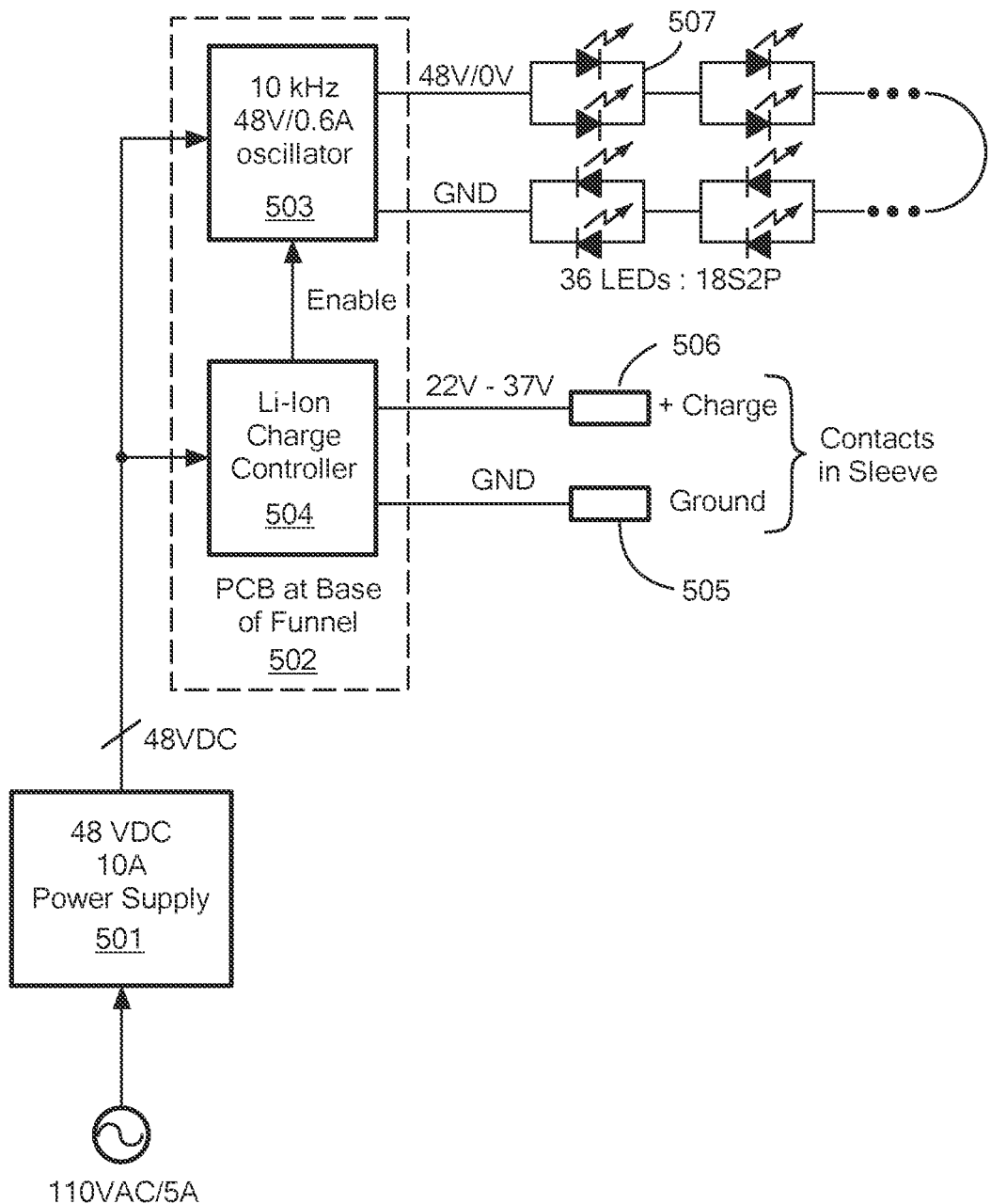
FIG. 5 depicts an electrical block diagram of a landing base having conductive charging, in accordance with one embodiment of the invention.

FIG. 5 is an electrical block diagram that describes the sub-systems for a conductively charging embodiment of the landing base. Many embodiments of the UAS involve mounting the landing base in an elevated location, such as the top of a tower, similar to those used for telecommunication services. The elevated location reduces the risk of tampering by unauthorized personnel, as well as the risk to human life, as the UAVs land and takeoff with rotor blades spinning at a high rate. As with telecommunication systems on towers, it proves advantageous to power the landing base with a 48 VDC power source, as this voltage is below the 50V hazard threshold set forth by the Occupational Safety and Health Administration. From a weather-safe structure or enclosure on the ground, utility alternating current, such as from a 110 VAC source, is converted to 48 VDC, using a readily available power supply. The 48 VDC is brought up the tower using two-conductor cable. Within the exemplary landing base, a single printed circuit board, mounted within a weather-sealed compartment, includes a power oscillator, to flash the IR LEDs at a 10 kHz rate, and a Lithium-Ion battery charge controller, designed specifically to charge a 9S battery module within the exemplary UAV.

Power supply 501 is connected to the landing base 502. Landing base 502 includes an oscillator 503 and a controller 504. The controller 504 is connected to the ground contacts 505 and charge contacts 506. Contacts 407 are examples of ground and charge contacts 505, 506. The oscillator is connected to LEDs 507. LEDs 406 are examples of LEDs 507.

Figure 6:
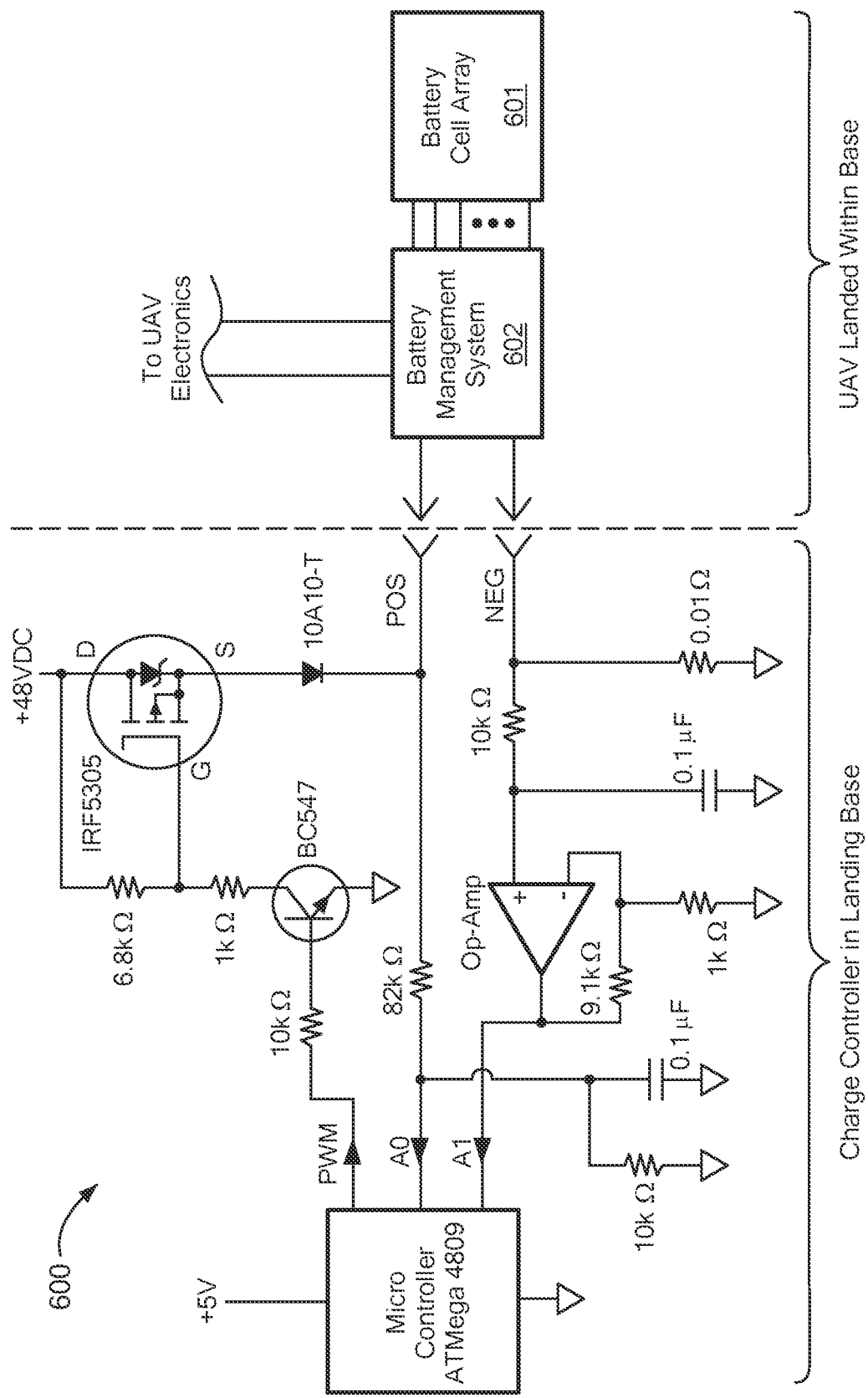
FIG. 6 is a diagram charge controller circuit 600 in accordance with an embodiment of the invention.

FIG. 6 is an exemplary charge controller circuit schematic, and its relationship to the battery management system within the UAV. In this embodiment, the battery cell array 601 within the UAV is configured as 9S2P, resulting in a nominal module output voltage of 32.4 VDC. When fully charged, the battery module provides 37.4 VDC, and when fully discharged, the module voltage drops to 22.5 VDC. The battery management system 602 within the UAV provides many safety functions, including cell balancing to ensure that all cells are charged to the same voltage, thermal protection, over-current protection, over-voltage protection, and under-voltage protection. When the landing peg of the UAV becomes fully seated in the landing base sleeve, an electrical connection is established between the charge controller within the landing base, and the battery management system within the UAV. The charge controller detects the presence of the UAV, as the voltage from the UAV battery module presents itself to the AG analog input of the Charge Microprocessor 603. The Charge Microprocessor 603, with programmed knowledge of the battery module configuration and chemistry, assesses the state of charge of the battery module, and the necessary charging requirements. In the exemplary embodiment, the UAV battery cell array is constructed from Samsung 50E2 21700 Lithium-Ion battery cells, similar to those used in Tesla automobiles.

The Charge Microprocessor, as the brains of the charge controller, is programmed to follow the three distinct phases of charging Lithium-Ion batteries:
(1.) Constant-current phase—For maximum battery life, the manufacturer recommends a charging rate of 0.5 C, which is half the one-hour discharge rate. For the exemplary embodiment, it translates to a charging current of 2.5 A per cell. With pairs of cells wired in parallel, the module charging current is 5.0 A. The constant-current phase continues until the individual cell voltages reach 4.15V, at which point the second phase begins.
(2.) Constant-voltage phase—All cells are held at no more than 4.15V, and the current gradually tapers as the cells approach full capacity. The cell balancing function within the battery management system ensures that the Charge Microprocessor can infer the cell voltages by observing 37.35V for the series connection of nine cells within the battery array.
(3.) Cutoff phase—Once the current has tapered to a low value, such as C/24, the charging process is halted. For this embodiment, the cutoff current threshold is 417 mA. Unlike Lead-Acid batteries, wherein "trickle charging" is common, Lithium-Ion batteries will heat and potentially combust unless charging is halted. The Charge Microprocessor periodically restart charging, to ensure that the batteries remain fully charged, in the instance that the UAV remains parked for some time. However, the charging must again be halted if the current rate is below the threshold value.

In FIG. 6, the buck converter is composed of the IRF5305 power MOSFET, and the BC547 NPN transistor. The Charge Microprocessor adjusts the duty cycle of a pulse-width modulated (PWM) signal coupled to the BC547, which causes current to flow from the +48 VDC supply, through the MOSFET and its blocking diode, to the battery management system onboard the UAV. As feedback on the state of charge, the Charge Microprocessor measures the voltage of the battery array though the input A0. As feedback on the rate of charge, a small value resistor, in the return path from the battery module, produces a small voltage that is proportional to the charge current. The voltage across the small value resistor is amplified, and then coupled to the A1 analog input of the Charge Microprocessor. With knowledge of the battery array voltage and charge current, the Charge Microprocessor systematically executes the three phases of battery module charging though the adjustment of the PWM signal.

Figure 7:
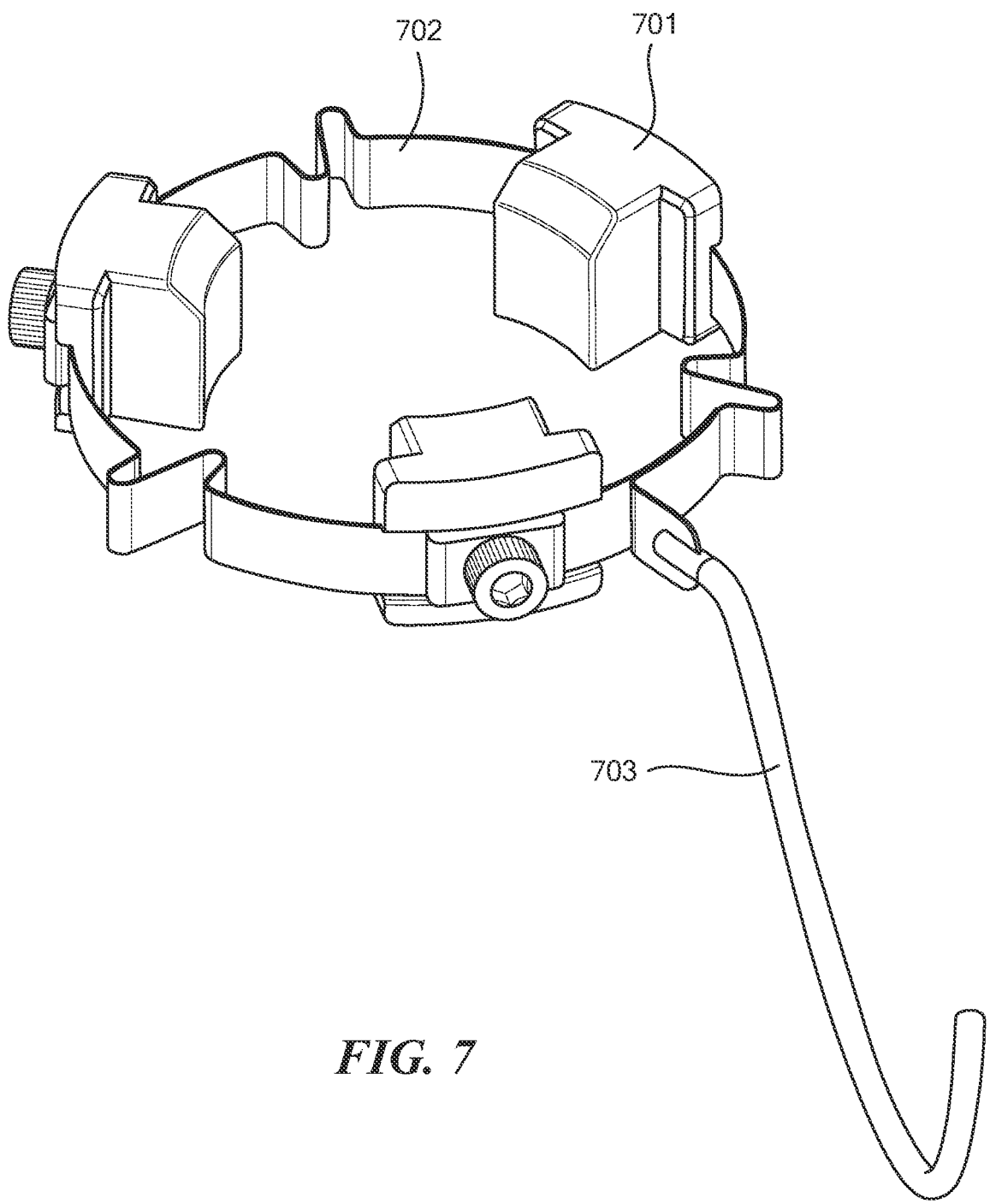
FIG. 7 is a perspective view of charging brushes 701, conductive spring 702, and cable 703.
Figure 8A:
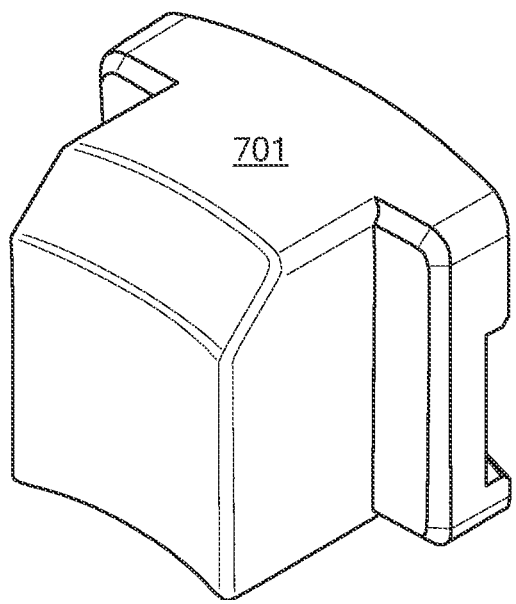
FIG. 8A is a perspective view of charging brush 701.
Figure 8B:
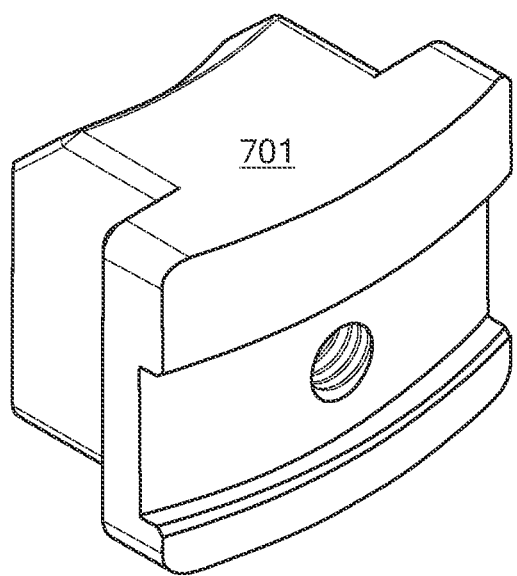
FIG. 8B is a perspective view of charging brush 701.
Figure 8C:
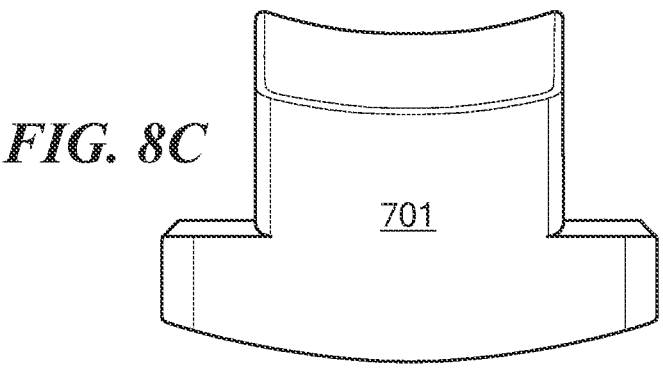
FIG. 8C is a side view of charging brush 701.
Figure 8D:
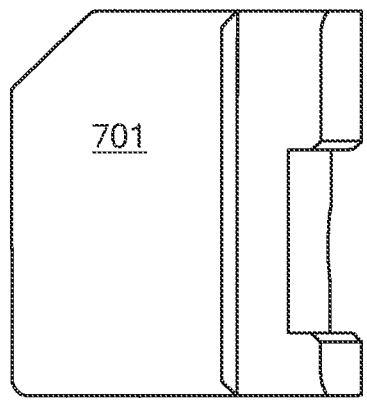
FIG. 8D is a side view of charging brush 701.
Figure 8E:
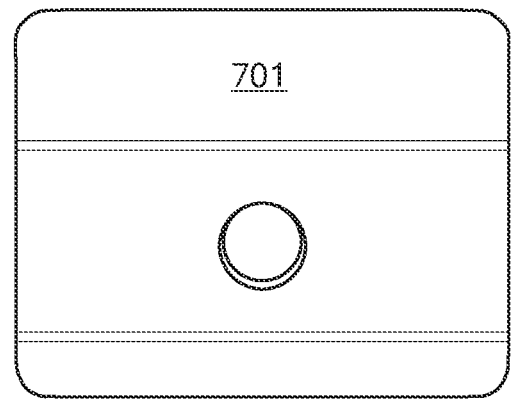
FIG. 8E is a front view of charging brush 701.

FIG. 7 illustrates an exemplary set of charging brushes 701, garter spring 702, and electrical cable 703. In this embodiment, three charging brushes 701 are positioned 120 degrees apart, such that the spring forces maintain the landing peg centered within the landing sleeve, reducing the wearing effects of the peg sliding against the sleeve. In FIG. 7, the garter spring is formed from a band of stainless steel, with the S-shaped pattern between contact brushes designed for the required spring constant. The metal band electrically connects the charging brushes, such that a single electrical cable 703 provides the required connection for all three charging brushes 701. In other embodiments, separate wires are connected and joined for each charging brush. Some embodiments use a traditional coiled garter spring instead of the strap garter spring, and yet other embodiments have separate springs for each charging brush. The material used for the charging brushes vary by embodiment. In some instances, the charging brushes are like the carbon brushes of a motor, composed of graphite and metal powders, held together with a binder. In other instances, the brushes are made of a soft metal such as copper.

FIGS. 8A, 8B, 8C, 8D, and 8E illustrate the details for an exemplary charging brush 701. The surface of the brush making contact with the ring of the landing peg protrudes through the wall of the landing sleeve, though the ledges around the back portion of the brush outside the sleeve limit the distance that the brush can protrude into the sleeve. A tapered profile along the top edge of the brush contact surface allows the hemispherical surface at the end of the landing peg to force the retraction of the brush, though retained within the sleeve by the springs holding the brushes as a ring around the sleeve. In this embodiment, the charging brush is electrically connected with the other charging brushes using a wire and lug, which is secured by a screw into the charging brush.

Some embodiments of the UAS utilize wireless charging instead of conductive charging. The advantages of conductive charging are high electrical efficiency and minimal cost. The disadvantage of conductive charging is having exposed contacts subject to abrasion, weather damage, and potential human hazard. The advantages of wireless charging are high reliability and no human hazard. The disadvantages of wireless charging are reduced efficiency and higher cost. To mitigate the disadvantages of wireless charging, multiple research groups have studied the issues impacting both efficiency and cost. Significant advancements have occurred over the past decade.

Figure 9A:
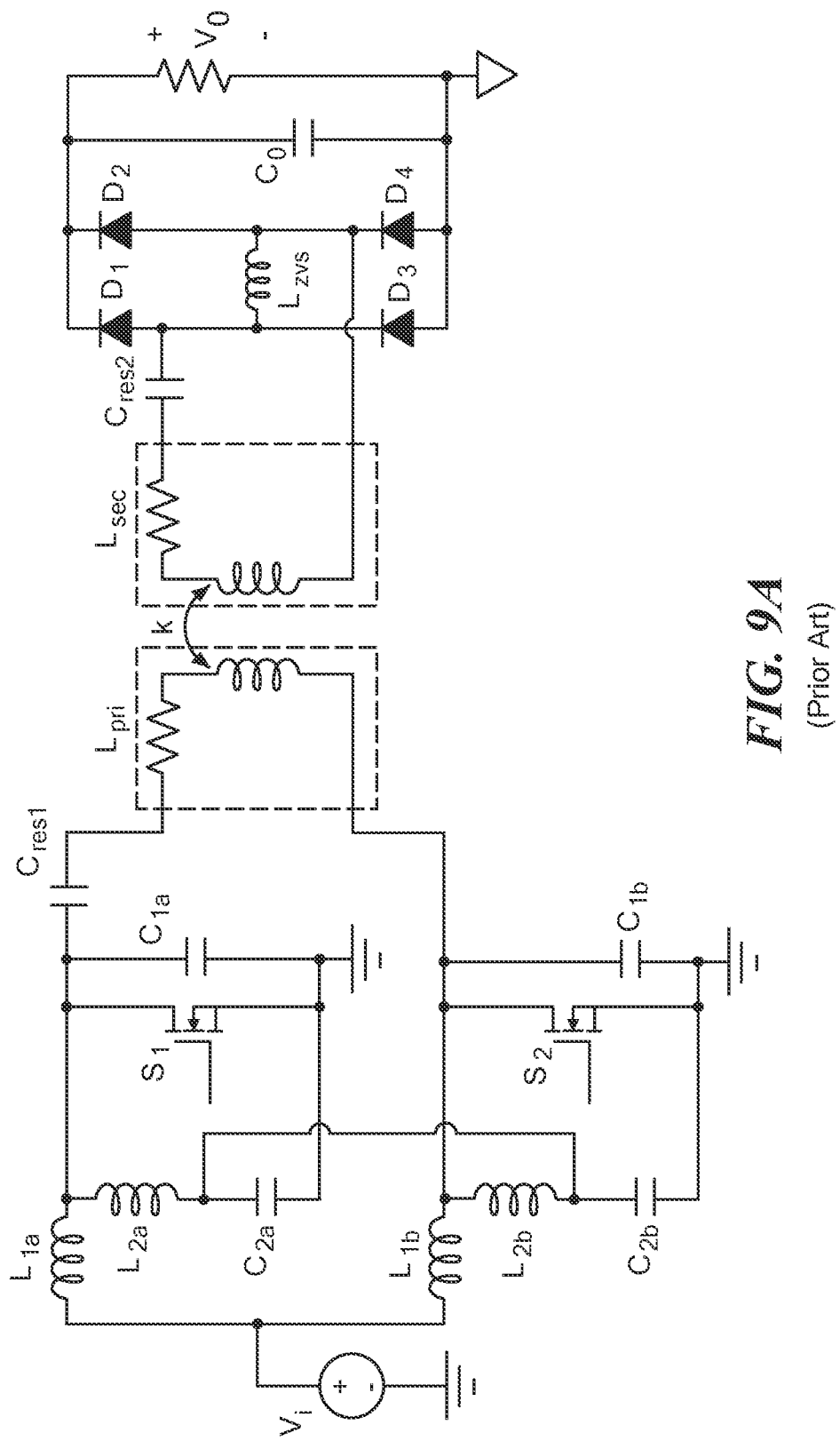
FIG. 9A is an Exemplary wireless charging circuit.

FIGS. 9A, 9B, and 9C illustrate a wireless charging schematic, similar to one described by Gu et al of Stanford University in 2021. The prototype system uses the 6.78 MHz ISM frequency band, transferring 1.7 kW DC power with an efficiency of 95.7%. Unlike most wireless power systems operating between 20 kHz and 200 kHz, wherein the magnetic coils dominate the losses, size and cost of the wireless power transfer, the higher frequency band allows the potential for higher efficiency and power density, as a coil's quality factor naturally increases with frequency. However, prior wireless power systems operating at 6.78 MHz have suffered from poor efficiency in the high-frequency inverter. The problem can be solved with a high-Q self-resonant coil. The breakthrough relies upon magnetic ferrite and capacitance ballasting, which forces equal current sharing among multiple winding layers. Given the high efficiency, low weight, and low cost it is ideally suited for embodiments of the UAS that uses wireless charging.

For wireless charging, the charging brushes in the landing sleeve are replaced by an RF transmission coil. The charge controller in the landing base is replaced by an RF inverter, which in this embodiment converts 48 VDC to RF power at 6.78 MHz. The output of the inverter is coupled to the RF transmission coil. On the receiving side, the charging rings in the landing peg are replaced by an RF reception coil. The RF reception coil is coupled to a rectifier and filter circuit, which produces DC power for charging the batteries. The output of the rectifier and filter is coupled to a charge controller, which is designed specifically for the charge profile of the battery cell array. The choice of wireless charging for the UAS requires the charge controller to be relocated from the landing base to the UAV, as the charge controller directly modulates the voltage and current applied to the battery modules, while the output of the rectifier and filter is at a constant DC voltage.

An exemplary precision landing system relies upon two levels of frequency-domain filtering, to reduce the interference effects of sunlight. First, the beacon system uses a set of IR LEDs, emitting near-infrared radiation around the wavelength of 940 nm. On the receiving side, within the base of the UAV, IR photodiodes include filters to preferentially receive radiation around 940 nm. While sunlight includes energy within the infrared spectrum, the band around 940 nm experiences pronounced atmospheric absorption due to water vapor, advantageously reducing the power spectral density at the earth's surface. In other embodiments different bands are used. The second level of frequency-domain filtering occurs by flashing the IR LEDs at a high rate, and similarly filtering the received IR photodiode signals with a matching frequency band. For the exemplary embodiment, we have chosen a rate of 10 kHz. Though IR photodiodes transform sunlight into a mostly constant photocurrent, some spectral noise is present, including contributions from shot (quantum) noise, which tapers with 1/f, as well as from thermal noise and dark current noise, both having constant (white) power spectral density. The corner frequency at which thermal noise and dark current noise begin to dominate over the shot noise occurs around 100 Hz, two orders of magnitude below the chosen flashing rate of the IR LEDs. Amplification and narrowband filtering of the IR photodiode signals around 10 kHz provides significant rejection from sunlight noise sources, a technique similarly adopted for TV remote controls. The range of an exemplary embodiment of the precision landing system, based upon the methods described, are 30 m, although other ranges can be used.

For the embodiment described by FIG. 5, the 10 kHz oscillator produces a square-wave output, with a 50% duty cycle, causing 48 VDC to appear at the output for 50 uS, followed by a 50 uS interval with 0 VDC, and then repeating the cycle. A ring of IR LEDs, with radiation centered at 940 nm, are arranged as 18 LED pairs in series, for a total of 36 LEDs. Each LED has a potential of 2.67V, resulting in a current of 300 mA through each. Because the 48 VDC supply voltage closely matches the requirement for voltage and current of the LEDs, the embodiment avoids the additional expense for DC-to-DC converters, or the power loss resulting from the use of dropping resistors.

In other embodiments of the IR beacon and IR receiver, the 10 kHz oscillator of the transmitter is replaced by a pseudo-noise (PN) sequence generator. As with code-division multiple access communication systems, the PN generator runs at a high chipping rate, with the pattern eventually repeating itself at a much slower rate. Embodiments of PN generators include those which use maximal length sequences, Barker codes, Kasami codes, and Gold codes. On the receiver side, the bandpass filter is replaced by a broadband gain stage, and optionally an AGC stage. The A/D converter must operate at the chipping rate of the PN generator or higher. In some embodiments, a phase-locked loop provides a means of synchronizing the A/D sampling with the received PN sequence. Once digitized, the signal is correlated with the matching PN sequence. When the output of the correlator exceeds a threshold absolute value, then a valid IR beacon signal is known to be received. The processed gain is a function of the sequence length. In an illustrious embodiment, a Kasami code generator has a code length of 1023 bits, operating at a chipping rate of 102.3 kHz, resulting in the sequence repeating at a rate of 100 Hz. The processed gain through the correlator is 30 dB, allowing a detection range of 200 m or greater.

Some embodiments of the IR beacon system overlay the transmission of data bits with the flashing of the LEDs, whether the underlying flashing mechanism is a simple oscillator or PN generator. One exemplary means of conveying data with a square wave oscillator is through frequency modulation. In an illustrative embodiment, the beacon sends one-way data to the UAV at a rate of 1200 bits per second, by flashing the IR LEDs at a rate of 38.4 kHz, for a total of 32 cycles, to represent a "0" bit of data, and flashing the IR LEDs at a rate of 40.8 kHz, for a total of 34 cycles, to represent a "1" bit of data. For systems utilizing a PN sequence as the IR beacon generator, some embodiments convey digital information by complementing the chipping sequence to represent a "0" versus a "1." The polarity of the receive correlator output thus becomes the value of an individual bit of information.

Added UAS functionality is be achieved by conveying one-way data from the landing base to the UAV. In some embodiments of the UAS, the landing base includes instrumentation to measure weather data, including the wind speed, wind direction and barometric pressure. Overlaying important aeronautical data within the beacon signal provides the UAV with information that is helpful for its autonomous landing, much like the Automated Terminal Information Service has been for pilots landing manned aircraft at airports. In other embodiments of the UAS, the one-way data provided by the landing base indicates its availability. In an exemplary embodiment, a currently occupied landing base will inform a hovering UAV that the presently charging UAV will depart within a certain number of minutes. The UAV then determines whether to wait at the present landing base, or to divert to another landing base within a viable range.

Figure 10:
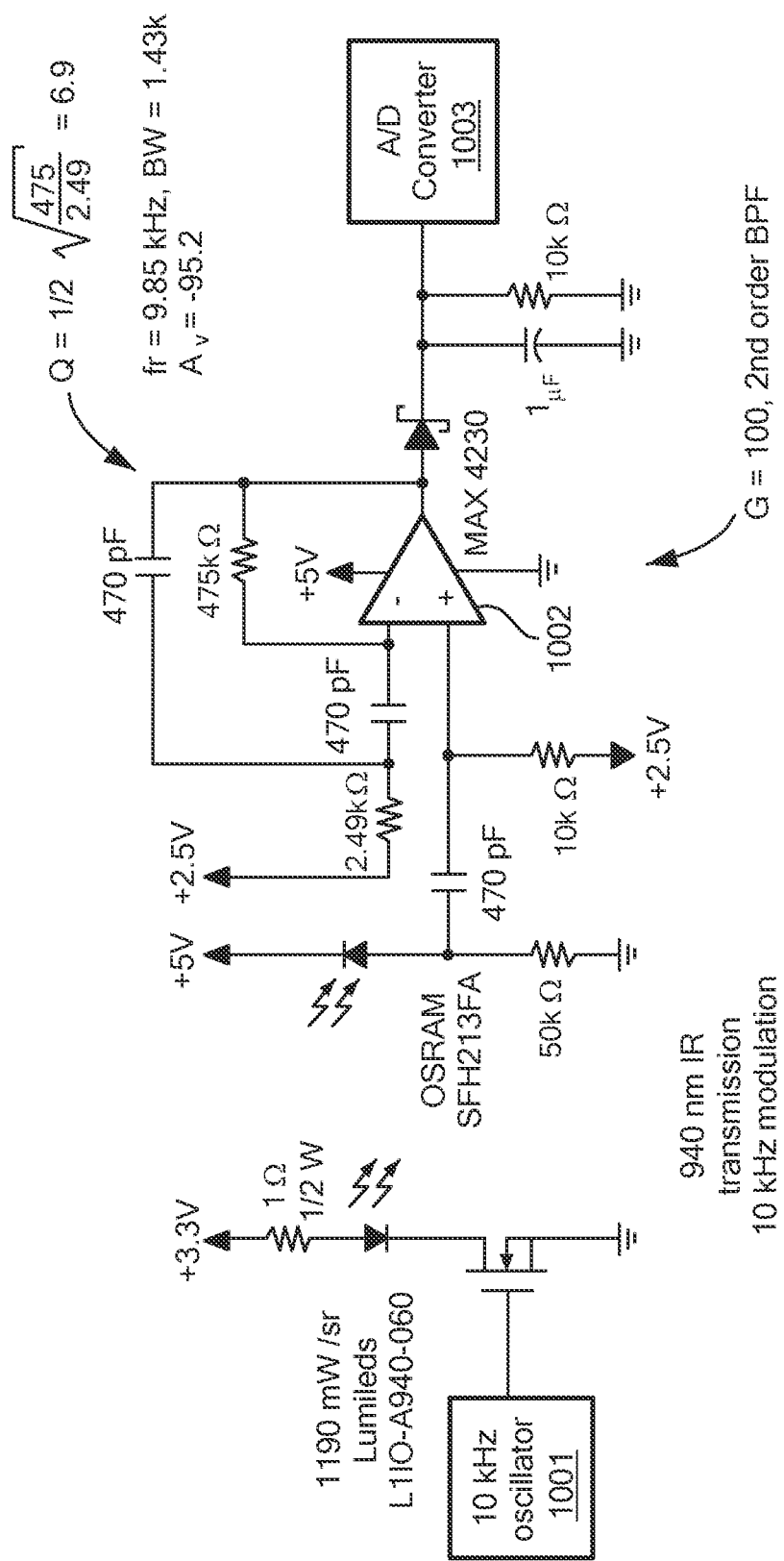
FIG. 10 is an exemplary schematic for a single channel of the precision landing system IR beacon and IR receiver.

FIG. 10 is an exemplary schematic 1000 for a single channel of the precision landing system IR beacon and IR receiver. The IR beacon transmits a pulse sequence to the IR receiver comprising an analog circuit. The analog circuit comprises an analog-to-digital converter, turning the light signals received from the base into data. Some embodiments of the IR beacon use a multiplicity of 940 nm LEDs, such as the Lumileds L1IO-A0940-060. This particular LED has a half-power beamwidth of 60 degrees, an electrical-to-radiant efficiency of roughly 50%, and a radiant intensity of 1190 mW/sr when operating with 1 A of current. This exemplary circuit uses oscillator 1001 to pulse an LED at a 10 kHz rate, which is matched by the filtering on the receiver side. The IR signals are detected using an IR photodiode in the exemplary schematic. The IR photodiode is the OSRAM SFH213FA, which includes a broadband filter centered at 900 nm. To reduce the photocurrent caused by sunlight, which can cause photodiode saturation, many embodiments include narrowband IR filters, which augment the broadband filtering integral to the SFH213FA. As shown in FIG. 10, the photodiode 1002 is connected to a 5V source, and the resistor value in series with the diode is chosen to be 50 kohms. Selecting of resistor value balances the need for sufficient signal from the IR beacon, with the risk of sunlight saturation (approaching the supply voltage). The voltage across the 50 kohm resistor into AC coupled into a second-order bandpass filter, implemented with a MAX4230 operational amplifier. The Q of the bandpass filter is 6.9 (1450 Hz bandwidth) and the voltage gain is 19.8 dB. The output of the bandpass filter is rectified and filtered, then coupled to an A/D converter 1003. Digital signals are then processed by a microprocessor.

In other embodiments of the IR beacon and IR receiver, greater range is achieved by operating with higher maximum passband gain. To avoid saturation at close ranges, an automatic-gain-control (AGC) circuit is included. So that the gains across a multiplicity of photodiode receivers remain synchronized, a single automatic gain parameter is computed and applied to the multiplicity of receiver chains. At close range, the AGC reduces the gain such that no receiver chain reaches a clipping condition. As the range increases, the AGC allows greater gain across the receiver chains, until operating at a maximum gain, wherein the IR beacon signal approaches the level of the combined noise sources. In some embodiments, the Q of the bandpass filter is increased, providing greater rejection of the sunlight noise signal. The limitation on the bandpass Q is the rate at which the levels vary with the attitude and position of the UAV, requiring a higher sampling and processing rate. For the exemplary contra-rotating helicopter, wherein the IR image is formed by taking samples during rotation of the IR photodiodes, a bandwidth of 350 Hz, corresponding to a Q of 29, becomes the limit. For other vertical lift UAVs, wherein the array of photodiodes is affixed to the central position of a fuselage that is not rotating, the modest rate of change of the attitude and position of the UAV allow the bandwidth to be reduced to less than 100 Hz. As compared with the exemplary receiver from FIG. 10, such a reduction in bandwidth improves the SNR of the IR beacon signal by 12 dB. When combined with AGC, a range of 100 m between the exemplary UAV and the exemplary landing base is realized.

The intensity of IR light emitted by the beacon plays a direct relationship in the achievable range of the precision landing system. A range of at least 30 m is highly desirable, as a UAV may approach the landing location at what it believes is a 30 m altitude, based upon GPS data, setting itself up for an autonomous vertical descent. At a 30 m altitude, the UAV will in most cases have sufficient altitude to clear trees and structures within the area. Once over the landing location, the IR beacon needs a radiation pattern which ensures reception by the IR receiver in the UAV, accounting for a maximum GPS positioning error of 10 m in both horizontal and vertical axes. The worst-case angular error, presuming the true altitude is 20 m, and the horizontal position of the landing base is off by 10 m, is 27 degrees from the vertical axis. The exemplary IR LED, model Lumileds L1IO-A0940-060, if positioned facing vertically, reaches a half-power intensity at 30 degrees off axis, making it well suited for the needs of the UAS precision landing system, considering a 30 m range and worst-case GPS accuracy. However, the intensity and position of a single IR LED are not sufficient for the application. Rather, a multiplicity of IR LEDs is necessary to achieve the required range, accounting for various enhancements, including the two means of frequency-domain signal discrimination. Because the goal of the precision landing system is for the UAV to insert the landing peg into the landing sleeve, an advantageous arrangement of the IR LEDs is forming a ring around the perimeter of the landing funnel.

IR LEDs are designed to be mounted on a printed circuit board, either with through-hole leads, or as surface mount components, such as the Lumileds L1IO-A0940-060. Creating a large annular-shaped printed circuit board for the IR LEDs is certainly possible. However, a large waste of material would occur, as the central section of the printed circuit board would be discarded.

Figure 11A:
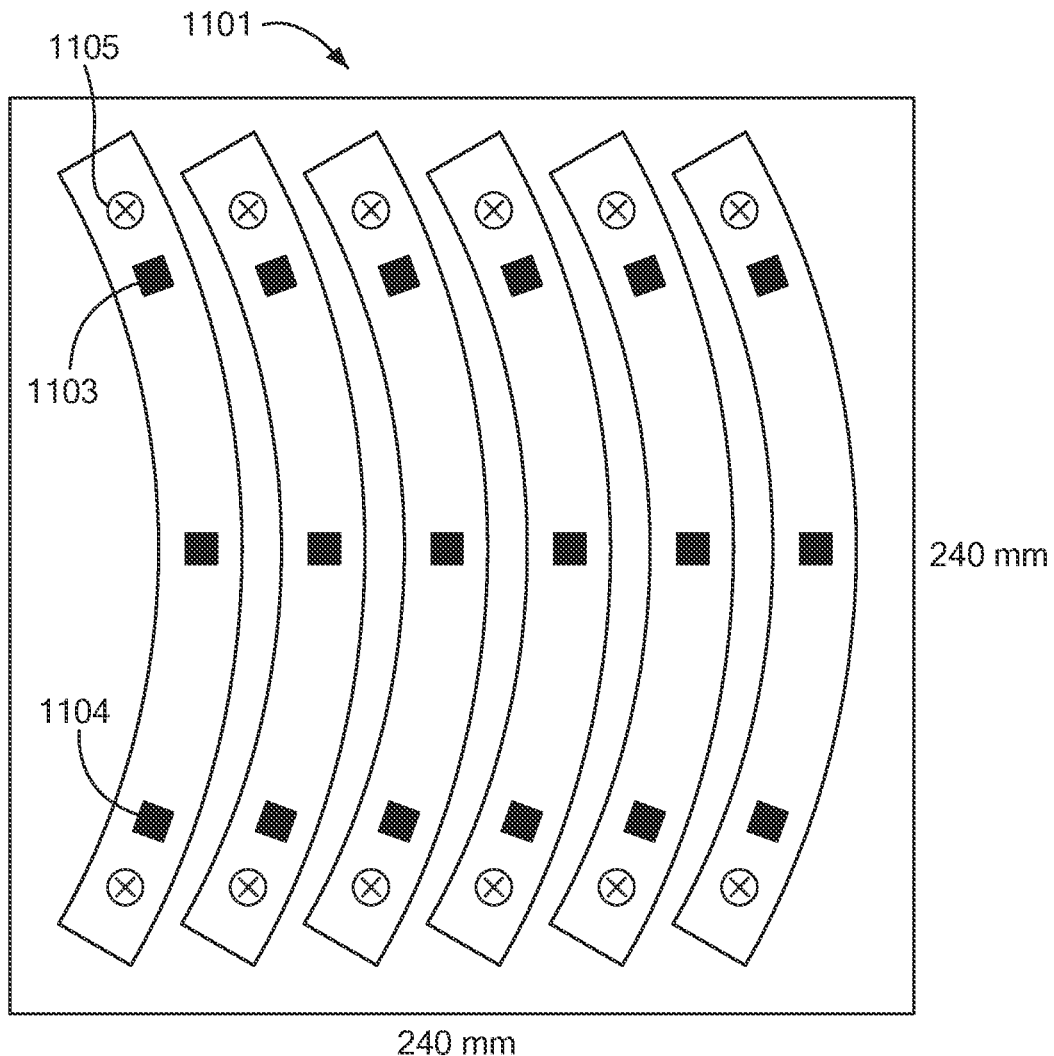
FIG. 11A is a diagram of a beacon emitter PCB segment grouping.
Figure 11B:
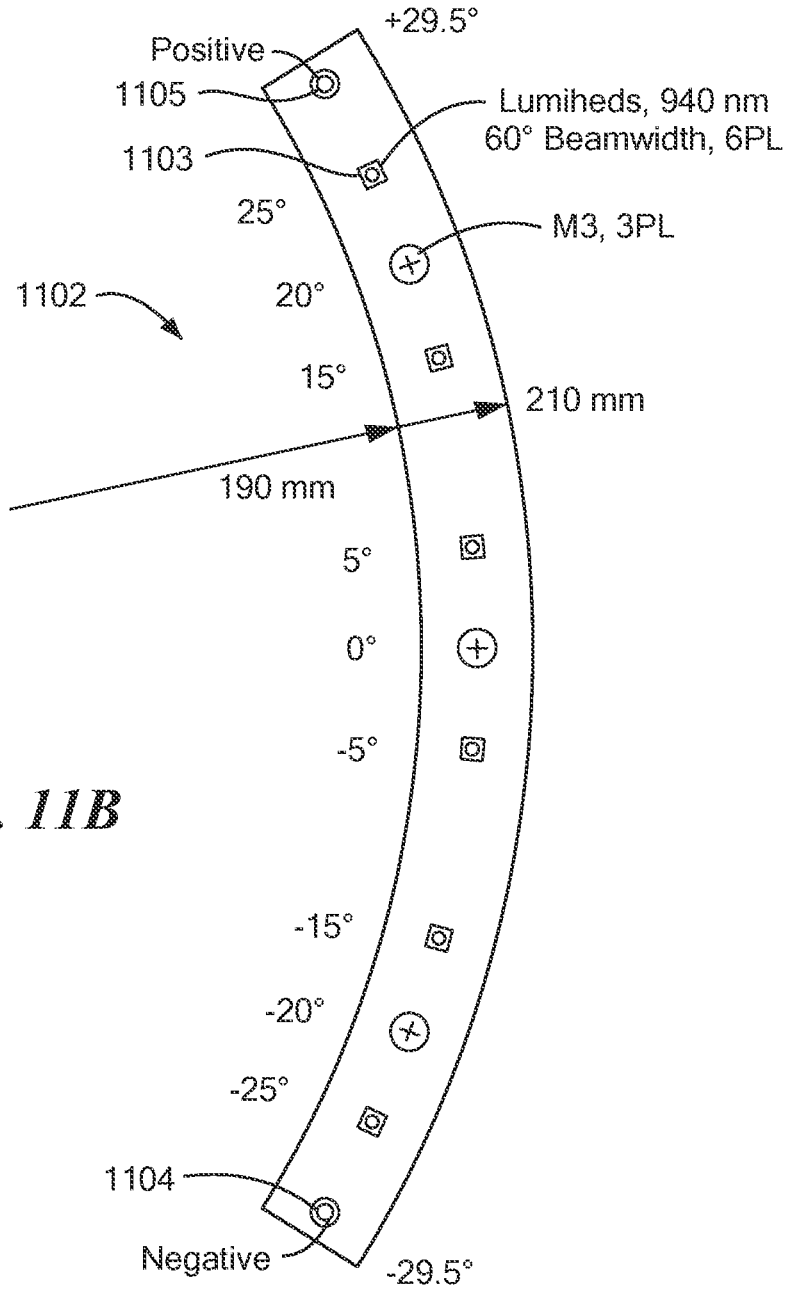
FIG. 11B is a diagram of a beacon emitter PCB segment detail.

FIG. 11A illustrates a method of manufacturing six segments of printed circuit board 1101, nested as a panel, each segment covering an angle of 60 degrees. The panel is fabricated, components are placed, and soldering occurs. Subsequently, the individual segments are broken loose from the panel, and mounted around the perimeter of the landing funnel. FIG. 11B illustrates a 60-degree printed circuit board segment 1102. IR LEDs 1103 are placed at intervals of 10 degrees. The six IR LEDs per segment are wired as pairs in parallel, and three pairs in series. Six segments of six LEDs form the full circle, connecting the boards with a single wire from end 1104 to end 1105. As FIG. 5 illustrates, the exemplary ring of LEDs is powered from the 48 VDC power source, pulsed at a 10 kHz rate. Each LED sees a voltage of approximately 2.64V, which creates a current flow of 300 mA through the exemplary IR LED. Hence, the total power consumption of the 36 LEDs is 14.4 W, presuming a 50% duty cycle from the 10 kHz square-wave oscillator.

Having discussed the IR beacon and a single chain of the IR receiver, we will now describe how a multiplicity of IR photodetectors can create a low-resolution IR image suitable for navigating the UAV to the landing base. There are two categories of embodiments to consider: (a.) those using a rotating frame of reference to create a scanned IR image from a multiplicity of IR photodetectors, and (b.) those using a fixed frame of reference, whereby each photodetector represents a discrete pixel within the low-resolution IR image. We will first consider the rotating frame category, and an embodiment for the Contra-Rotating Electric Helicopter UAV.

Figure 12:
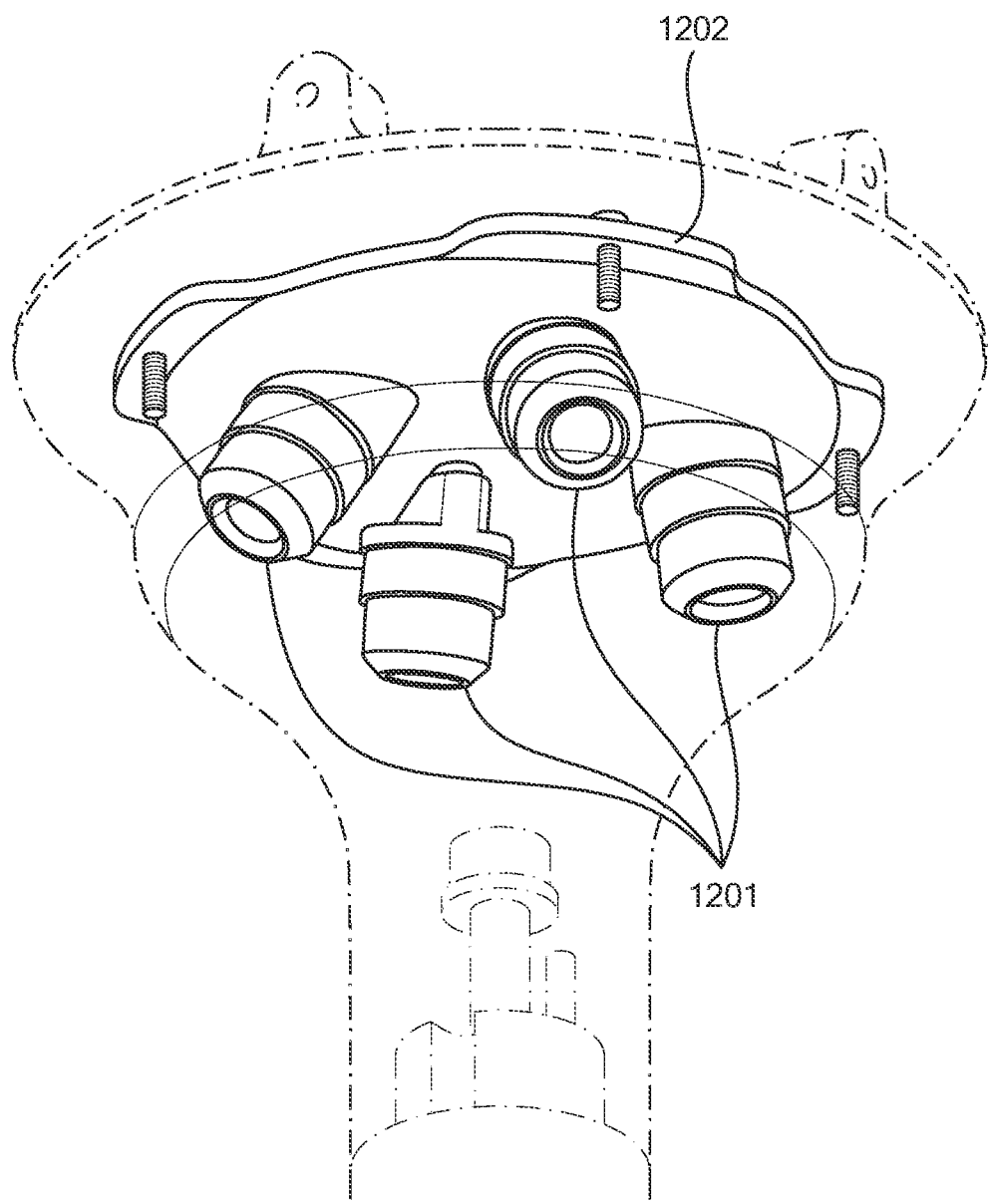
FIG. 12 is a perspective view of a precision landing system 1200 comprising a rotating IR photodiode receiver array in accordance with one embodiment of the invention.

FIG. 12 illustrates an IR photodiode array and the associated processing printed circuit board, for a precision landing receiver that relies upon the rotation of the central portion of the Contra-rotating Electric Helicopter UAV, to form a scanned IR image. Each IR photodiode 1201 is encased within an assembly that resembles a microscope objective lens. The assembly provides the distinct angular orientation of each IR photodiode, while also including a narrowband 940 nm filter to augment the broadband IR filtering within the photodiode. In the exemplary embodiment, each narrowband filter has a diameter of 8 mm, and a half-power passband of 40 nm. The four IR photodiode assemblies are attached to the processing printed circuit board 1202 by heat-staking plastic mounting posts that project through the printed circuit board. The leads for each photodiode are soldered to through-holes in the printed circuit board. The circuitry on the printed circuit board includes four channels of the exemplary analog processing shown in FIG. 10, a four-channel 16-bit A/D converter, and a microprocessor to periodically sample the digital signals representing the received power on each of the four IR photodiodes.

The scanned image formed by the illustrious embodiment in FIG. 12 covers a solid angle of approximately 3.4 steradians, centered on the axis of the landing peg. One of the IR photodiode assemblies has a central acceptance angle that is 10 degrees from the axis of the landing peg, and then the progression of the next three IR photodiode assemblies is set to 20, 30 and 40 degrees from the axis of the landing peg. To balance the mass of components around the central axis of the UAV, the photodiode assemblies are offset by 90 degrees in azimuth. The Contra-rotating Electric Helicopter UAV has a central body rotation rate of approximately 3 revolutions per second, turning in a counter-clockwise direction. The flight control processor is within the same rotating frame of reference as the IR photodiode array and its associated microprocessor. A magnetometer is integrated with the flight control processor, providing an accurate real-time indication of the IR photodiode array azimuth angle. The flight control processor communicates with the IR photodiode array microprocessor over a UART digital interface. At angular positions offset by 15 degrees in azimuth, the flight control processor instructs the IR photodiode array microprocessor to synchronously sample the four IR photodiodes. The microprocessor passes the four 16-bit samples to the flight control processor, then awaits its next command to once again sample. In this illustrious embodiment, all further processing occurs onboard the flight control processor.

Figure 13:
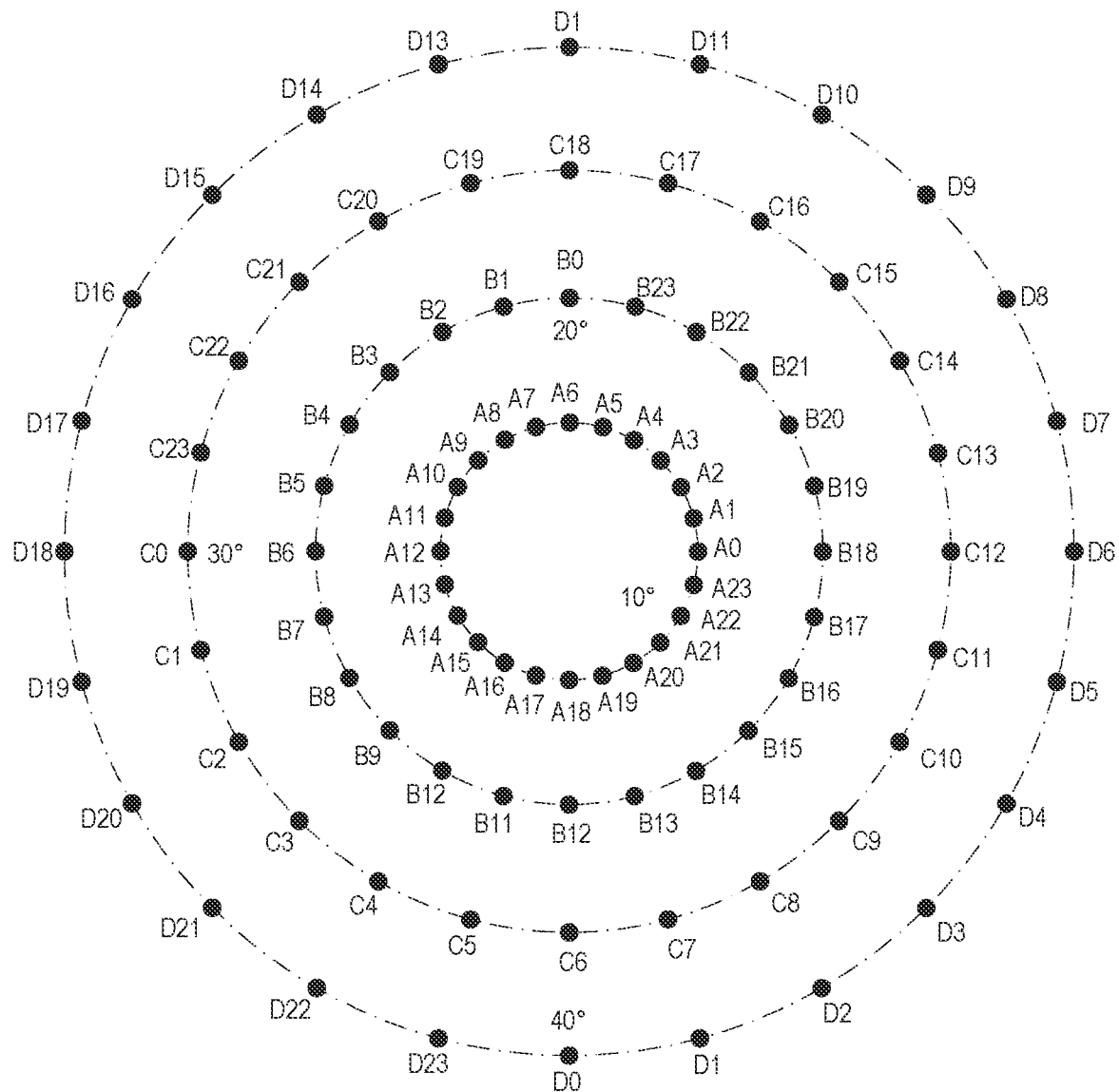
FIG. 13: illustrates the low-resolution IR sample positions interpreted onboard the flight control processor.

FIG. 13 illustrates the low-resolution IR sample positions interpreted onboard the flight control processor. Sample positions A0 through A23 represent the IR intensity of the 10-degree photodiode as it moves through azimuthal angles beginning at North, incrementing counter-clockwise by 15 degrees, through the progression of 345 degrees, 330 degrees, etc., ending with the A23 sample at 15 degrees. The sample values at each position are updated per rotation, implementing a simple low-pass filter over earlier samples. Sample positions B0 through B23 represent the IR intensity of the 20-degree photodiode, though the starting position is an azimuthal orientation of West (270 degrees). Sample positions C0 through C23 represent the IR intensity of the 30-degree photodiode, starting from an orientation of South (180 degrees). Finally, sample positions D0 through D23 are the sample positions of the 40-degree photodiode, starting from an orientation of East (90 degrees). A high degree of correlation exists between adjacent sample intensities, particularly in azimuth, as the half-power beamwidth of the exemplary IR photodiode is +/−10 degrees.

Having described the various aspects of an embodiment of a UAS consisting of:
- Contra-Rotating Electric Helicopter as the UAV
- Landing peg extending below the UAV
- Conductive charging rings on the landing peg
- IR photodiode array onboard the UAV to create a scanned IR image
- Landing base with conductive charging through the landing sleeve
- An array of IR LEDs around the landing funnel serving as the beacon We will now discuss an exemplary landing and charging procedure for the UAS. The procedure is implemented as software residing upon the flight control processor. In some embodiments, the flight control processor is based upon the ST Microelectronics STM32H7 family of microcontroller units, which have become popular as the flight control processor for small-unmanned aircraft.

In some embodiments, the landing coordinates are preprogrammed in the non-volatile memory of the flight control processor. In other embodiments, the landing coordinates are conveyed to the flight control processor through a wireless telemetry link. When instructed to land at a landing base, the flight control processor navigates the UAV to the known coordinates, relying upon real-time positional data provided by the onboard GPS/GNSS receiver. Because of the inaccuracy of the GPS/GNSS positional data, the UAV approaches the landing base at a safe altitude to avoid collision with natural and man-made structures. In the example we will discuss, a presumed altitude of 30 m is regarded as safe. As the UAV approaches the coordinates of the landing base, at the GPS/GNSS indicated altitude of 30 m above the base, the flight control processor begins to instruct the IR photodiode array microprocessor to sample the terrain below, forming a low-resolution circularly scanned image. If the landing base is directly below the UAV, and the UAV does not have a tilted attitude to deal with wind conditions, the 10-degree photodiode will display a uniform intensity value over azimuth, representing the 10 kHz flashing of the IR LED beacon ring of the landing base. At a 30 m altitude, the 20-degree photodiode will show a reduced intensity value, though again uniform in intensity, and the 30 and 40-degree photodiodes will show little or no intensity, being far off-axis.

Figure 14:
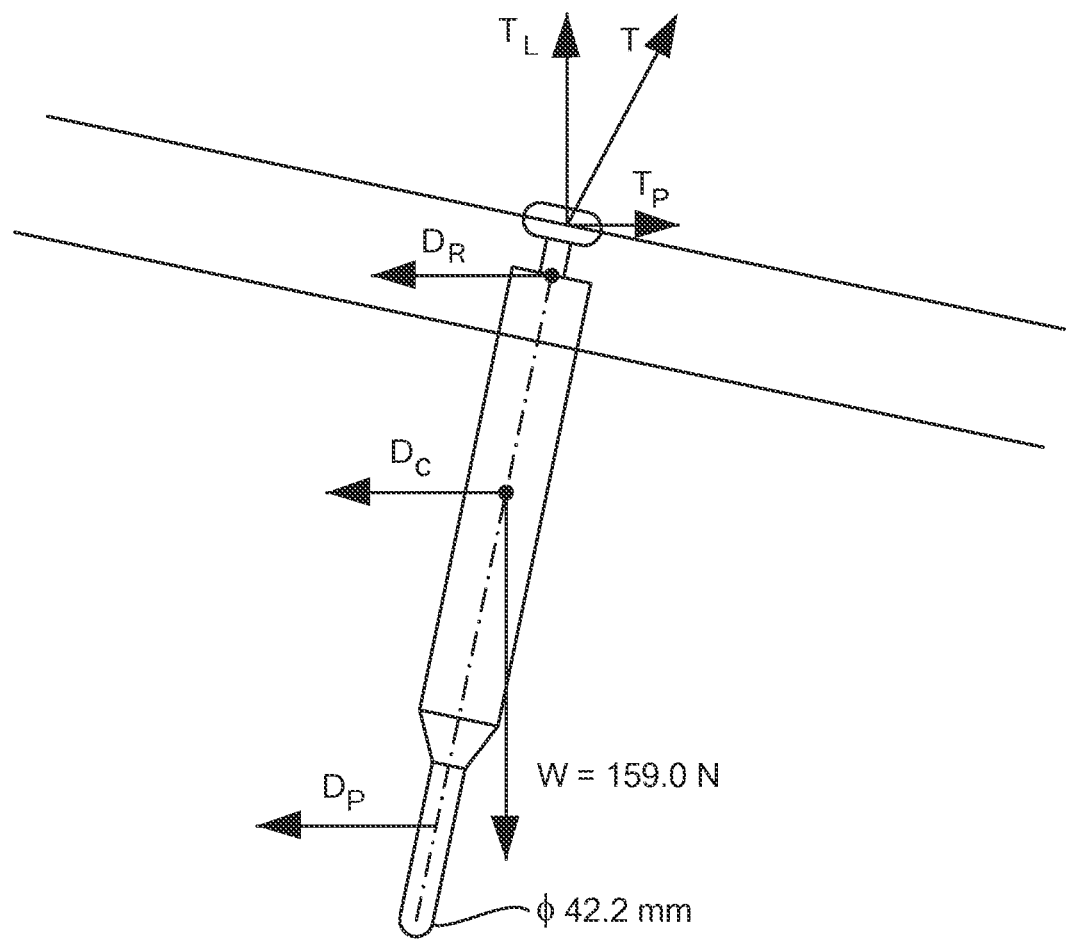
FIG. 14 illustrates the forces necessary to hold a UAV in a fixed position with wind.

To the extent the beacon does not display directly below the UAV, the flight control processor will navigate to the offset position that brings the landing base beacon signal to the center of the scanned image. During the process of centering the UAV, the flight control processor maintains the 30 m altitude to ensure safety. If the UAV is flying under wind conditions, it must tilt its attitude into the wind to hold a constant position in space. FIG. 14 illustrates the forces necessary to hold a UAV in a fixed position with wind. The drag forces of the wind exerted on the UAV ($D_r$, $D_c$, and $D_p$) must be counteracted by a thrust vector that has a horizontal component of propulsion equal to the sum of the drag forces, and a vertical component of lift, equal to the weight of the aircraft. A specific attitude angle and thrust magnitude are required to satisfy this balance, both scaling with the wind speed. As illustrated in FIG. 14, because the landing peg and the IR photodiode array are now tilted from a vertical orientation, a landing beacon directly below the UAV would appear to be off target. However, as long as the flight control processor navigates the landing procedure, keeping the beacon within the center of view, a safe and effective landing will occur, albeit at a descent angle dictated by the wind.

With the landing base beacon in the center of view, and beginning from the initial altitude of 30 m, the flight control processor slowly reduces the drive power to begin a descent, maintaining the landing beacon at the center of view. To the extent the beacon moves from the center position, the flight control processor will arrest the descent process until the beacon is returned to the center of view. As the UAV approaches the landing base, the IR LED array, forming a ring around the landing funnel, begins to produce more intensity on the 20-degree photodiode than on the 10-degree photodiode. This transition is indicative of an imminent landing, and hence the flight control processor reduces the descent rate to avoid a hard landing. Within the last meter above the landing base, the intensity will become greatest on the 30-degree photodiode, and finally on the 40-degree photodiode. In this final stage, the landing peg will be within the mouth of the landing funnel. As the landing peg contacts the funnel, having a hemispherical end-cap, and continually spinning, the landing peg quickly reaches the opening of the landing sleeve. To the extent that the UAV is flying under wind conditions, the peg will not easily slide into the landing sleeve. With the 40-degree photodiode showing greatest intensity, the UAV can safely apply cyclic to bring its axis of rotation into a vertical orientation, as the physical contact of the landing peg within the funnel and landing sleeve ensure that lateral movement due to the wind can no longer occur. Once the UAV has reached a vertical orientation, as the flight controller will observe from its IMU and magnetometer, it is then safe to slowly lower the landing peg into the landing sleeve. As this occurs, the 40-degree photodiode will gradually dim, as the receiver array drops below the radiation field of the IR beacon, finally embedding deep within the funnel, wherein the photodiodes show little or no energy.

As the spinning landing peg of the illustrious UAV becomes inserted in the stationary landing sleeve, a sequence of mechanical events occurs. First, the hemispherical tip of the landing peg causes the upper set of contact brushes (at the ground potential) to retract. Second, the hemispherical tip of the landing peg causes the lower set of contact brushes (which becomes the charging potential when active) to retract. As the landing peg continues to descend through the landing sleeve, the spring-loaded contact brushes tend to hold the landing peg near the center of the land sleeve, minimizing abrasion that would otherwise occur. Third, the lower contact ring on the landing peg passes over the upper (ground) contact brushes. An electrical circuit is not established at this point, because there is no return path. Fourth, the upper and lower contact rings on the landing peg simultaneously make electrical contact with the upper and lower contact brushes within the landing sleeve. Fifth, the concave surface on the tapered section of the UAV contacts the spherical rollers within the lower portion of the landing funnel, causing the rollers to begin spinning. As with contact brushes, the spherical rollers tend to hold the landing peg within the center of the landing sleeve, while also supporting the weight of the UAV.

Once the UAV is fully seated in the landing base, the flight control processor terminates power to the drive motor, which causes the rotors to gradually slow. In some embodiments, the charge microprocessor waits for a minute beyond detecting the voltage of the UAV battery modules before initiating the charging process. This delay allows time for the UAV rotors to come to a full stop. Once landed, the depth of the landing peg within the landing sleeve, and the mechanical strength of each, ensure that the UAV cannot tilt or lift from the landing base. However, wind can cause the rotors to begin moving in contra rotation. In some embodiments, the flight control processor detects the windmilling state of the rotors and applies braking to stop the undesired movement.

Charging of the UAV battery modules occurs over a matter of minutes or hours, depending upon the capabilities of the charge controller and the battery modules. For the illustrious embodiment, the charging occurs over a period of approximately two hours, which maximizes the cycle life of the batteries. Once the UAV is fully charged, the take-off procedure mirrors the landing procedure, making use of the precision landing system to reach a safe altitude over the landing base before vectoring toward a flight path. Of particular note, taking off with wind conditions, the UAV flight controller must apply cyclic to tilt into the wind, as it detects the 40-degree IR photodiode reaching the full intensity. This is the point when the tip of the landing peg is exiting the top of the landing sleeve. In some embodiments, the UAV receives the wind speed, wind direction, and barometric readings from its on onboard instruments, while in other embodiments, aeronautical information is provided by instruments installed within the proximity of the landing base. The UAV flight controller includes an aerodynamic model that allows it to compute the required thrust magnitude and tilt attitude to hold position under the existing wind conditions. By applying the required cyclic and drive thrust to achieve this attitude, the UAV rises above the landing funnel without appreciable lateral movement. It continues to ascend along a path with an inclination angle equal to the attitude angle of the UAV.

Figure 15:
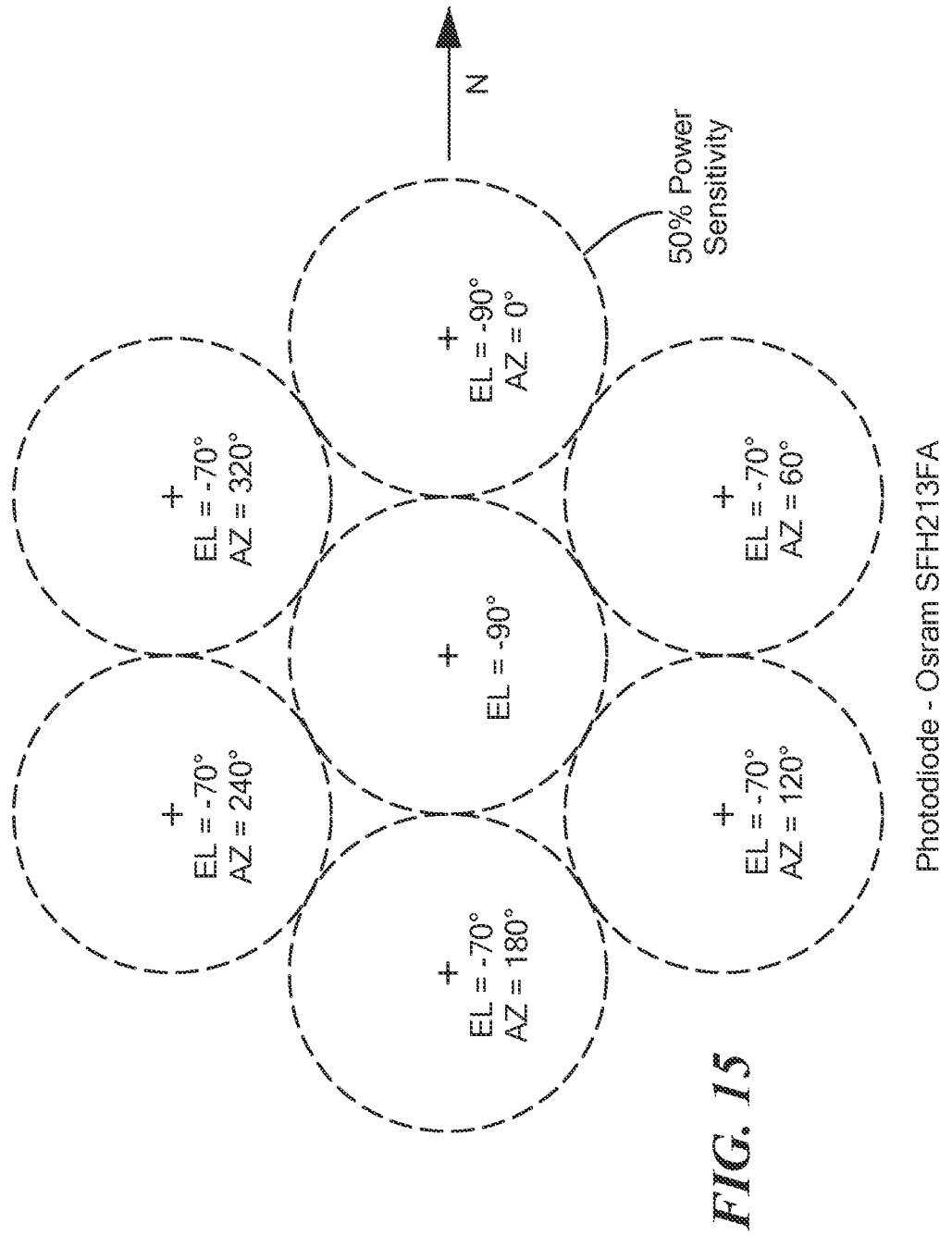
FIG. 15 illustrates the sample positions and half-power profile for the exemplary array consisting of seven IR photodiodes.

We will now consider a UAS precision landing system wherein the UAV is a quad-copter, such as an embodiment of the Rotorcraft Optimized for Forward Flight. The landing base capabilities remain the same, though the landing peg and the photodiode receiver array onboard the UAV are redesigned. In an illustrious embodiment, the landing peg is retracted within the UAV until the landing base is approached at the altitude of 30 m. Once the landing peg is lowered to its vertical orientation, it brings with it the coupled IR photodiode array. In an exemplary UAV, the detector array consists of seven discrete IR photodiodes. The central IR photodiode is embedded within the hemispherical tip of the landing peg, aimed directly along the axis of the landing peg. The other six IR photodiodes are mounted on the upper shoulder section of the landing peg, each tilted from the landing peg axis by 20 degrees, offset in azimuth by 60 degrees from one another. FIG. 15 illustrates the sample positions and half-power profile for the exemplary array consisting of seven IR photodiodes. The resolution of the resulting IR image is greatly reduced from the prior embodiment, wherein the rotation of the UAV provides the opportunity to create a scanned IR image. While the flight controller previously relied upon the ratio of IR photodetector power measurements to infer positions, the flight controller using the fixed IR photodiode array must infer the position based upon both the ratio of the powers as well as the absolute intensity values. At an altitude of 30 m, an inference of range comes with error, as atmospheric conditions such as fog cause additive attenuation. However, the critical measurements, such as the instance when the landing peg is entering the base of the funnel, occur at short range with minimal atmospheric variation. Certainly, the beacon and photodiode covers must be clean to avoid scattering and attenuation, and this becomes part of the ongoing maintenance requirements for the UAS.

Operating in all-weather conditions is required for many UAS applications. In these applications, the UAV itself must be designed to avoid damage caused by rain, for example. Critical for the UAV design is the use of sealed BLDC motors. While most low-cost drone motors are open to promote cooling, all-weather drones require sealed motors with external heat sink area to effectively dissipate the heat generated through wire resistance and mechanical friction. The landing base must also operate during rain. As FIG. 4 illustrates, the landing funnel includes a series of slots designed specifically to allow rain passage. The slots are narrow so the funnel surface is virtually smooth to the hemispherical tip of the landing peg. The base of the landing funnel includes additional channels to allow the passage of rain. The landing sleeve is left open at the bottom, to avoid the collection of water. Because the charging process occurs at a low voltage, water passage through the sleeve causes minimal short-circuit current.

Figure 16:
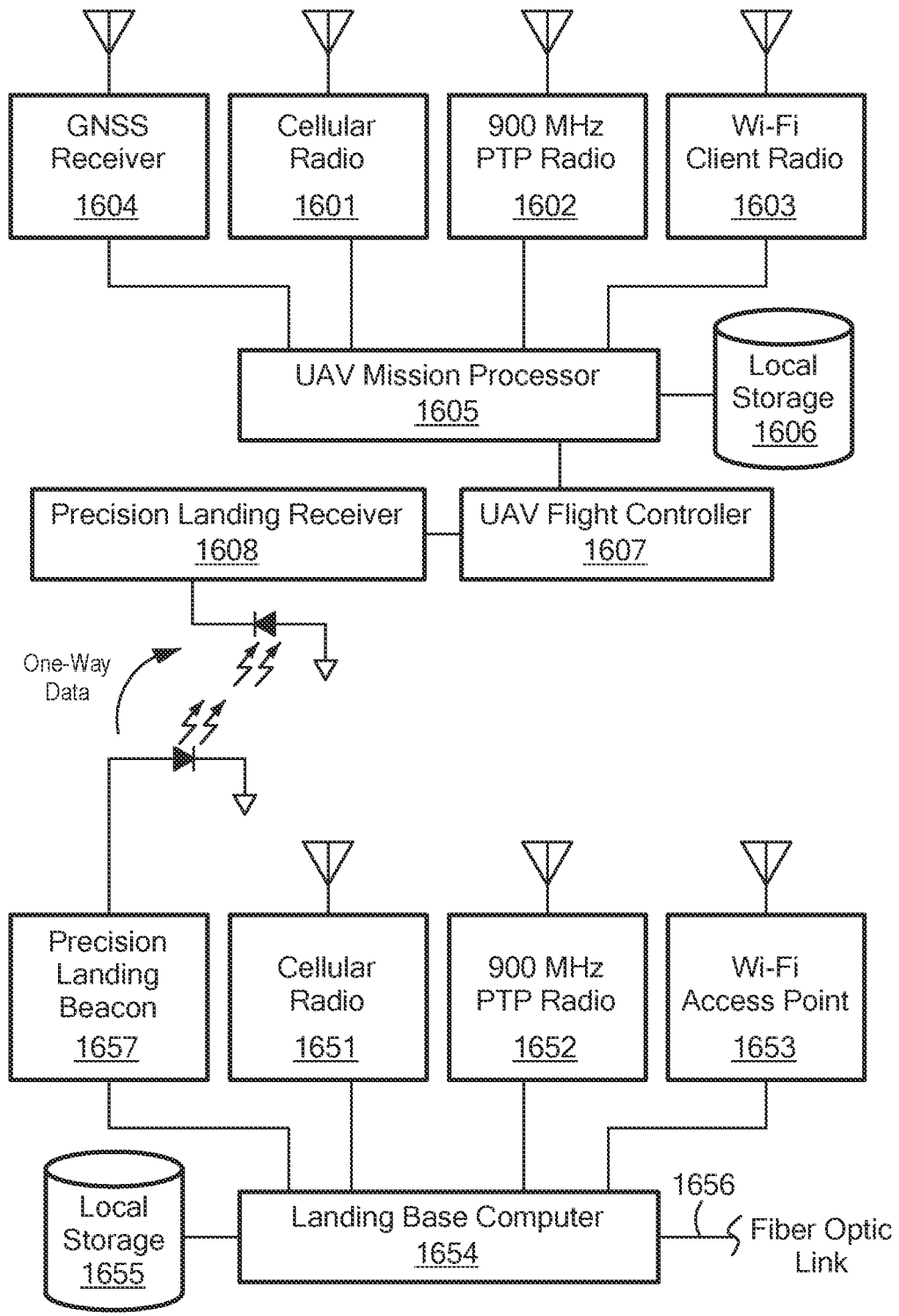
FIG. 16 is a flow chart of UAS Communication Modalities.

While the UAV is designed to take-off, land and charge autonomously, it operates as part of a UAS, requiring a coordination of its duties and a collection of mission data. FIG. 16 illustrates an example set of communication capabilities of the UAS. As described above, many embodiments of the UAS allow the landing base to convey critical information to the UAV through the IR beacon signal. When so equipped, this represents a low-speed one-way data link. During flight, many embodiments of the UAV include one or more long-range two-way data communication radios. Using publicly accessible mobile data services, some embodiments of the UAV include cellular radios 1601 that operate over 4G and 5G networks. Other embodiments of the UAV include point-to-point radios 1602 or multipoint radios 1603 that operate over private networks, such as those operating in the unlicensed band from 902 MHz to 928 MHz. The long-range radios used during flight allow the conveyance of control and audio/visual data. However, most long-range radios lack sufficient capacity to convey the large amounts of data that may be collected during flight. For example, some embodiments of the UAV include a cluster of UHD cameras to capture immersive 360-degree imagery. Even with state-of-the-art video compression, the aggregate rate of the data generation can exceed 100 Mbps in these embodiments. While reduced resolution imagery can be conveyed over a 4G network, for example, in many embodiments the full archive of the mission imagery is stored in non-volatile FLASH memory onboard the UAV. To facilitate the high-speed transfer of such data, while the UAV is hovering near or charging within a landing base, many embodiments of the UAS include Wi-Fi or Bluetooth radios in the UAV and landing base. Wi-Fi 6 now allows transfer rates of more than 1 Gbps, such that 100 GB of mission data can be downloaded to storage within the landing base or beyond, in less than 15 minutes. Other embodiments use a GNSS receiver 1604. Each of the various radios or receivers connect to the UAV mission processor 1605. The Mission processor may have a local storage 1606. The UAV mission processor 1605 can communicate with the UAV flight controller 1607. The flight controller also receives data from the landing base through precision landing receiver 1608.

As shown in FIG. 16, many embodiments of the landing base including fiber optic connectivity, allowing the high-speed transfer UAV mission data, and the coordination of UAV operations over dispersed geographies.

Embodiments of the UAV include artificial intelligence (AI) to execute a mission plan, even when the communications link is unavailable or undesirable. For example, in some military applications, avoiding detection by flying without radio emissions is critical. The AI technology allowing self-driving automobiles has advanced dramatically in recent years. Applying similar technologies to the UAS allows it to fly a predetermined mission, which may include complex navigation, data collection, and the need to alter the mission based upon real-time conditions. In terms of computing architecture, many embodiments of the UAV make a distinction between low-level flight controls, which operate the motors and actuators of the UAV, and the higher-level mission processor functionality, which typically includes AI inference and learning. The UAV flight controller in many embodiments is based upon the ST Microelectronics STM32 family of microcontrollers, which have become popular to control small-unmanned aircraft. These low-power and low-cost microcontrollers provide a computing performance of approximately 400 million operations per second (MOPs). In contrast, the UAV mission processor 1605, in many embodiments, has a highly parallel architecture, capable of more than one trillion operations per second. An exemplary mission processor is the NVIDIA Jetson AGX Xavier, having a peak performance of 30 trillion operations per second (TOPs), and consuming approximately 40 W of power. In many embodiments, the primary input data to the mission processor is high-resolution imagery, for example from CMOS image sensors. The mission processor can compressing the imagery for real-time storage or transmission, while also processing the imagery with artificial intelligence algorithms, to make decisions or assess the characteristics of an object or individuals.

The Landing base can use similar communication methods as the UAV, such as cellular radio 1651, point to point radio 1652, and Wi-Fi 1653. The communication method 1651, 1652, 1653 is coupled to the landing base computer 1654. Landing base computer has access to a local storage 1655 and may access other systems through a link 1656. The landing base computer communicates to the UAV through precision landing beacon 1657. The beacon can send one way data to the precision landing receiver 1608 to communicate various data to aid in the landing of the UAV.

Many embodiments of the UAS include a multiplicity of UAV working in a coordinated fashion. The mission of the UAS may be dispersed over large geographies, such as providing international border protection. In these applications, a multiplicity of landing bases provides an automated means for the UAV to intermittently fly and recharge. Within a region of the larger geography, some UAV will be flying, while others are recharging or undergoing maintenance. When an anomalous condition is detected by a UAV, some embodiments alert a terrestrial controller, whereby additional UAV are launched to provide backup assistance. Hence, having reserve UAV within proximity becomes a desirable feature of the UAS design.

In an embodiment of the invention, the UAV mission processor 1605 performs high level processing such as detecting unexpected objects in the air and directing the flight control to avoid said object. The UAV mission processor 1605 can receive mission data from a cloud, which may or may not also perform processing. The UAV Flight controller 1607 is configured to perform lower level functions, such as analyze the IMU, accelerometer, gyro, and other mechanics onboard to help steer the UAV. The UAV Flight controller 1607 may further run a control loop to stabilize the UAV and control the direction and GPS of the UAV. In the embodiment of FIG. 16, the UAV Flight controller 1607 analyzes the data received from precision landing receiver 1608 and causes the UAV to drive according to the precision landing system. In other embodiments, the UAV Mission processor 1605 can analyze and interpret the data from the precision landing receiver 1608. In some embodiments, a cloud controls a swarm of UAVs and communicates through each UAVs respective UAV mission processor 1605.

In some embodiments, the UAV has a camera that captures video data during flight. The camera can stream data through a communication device 1601, 1602, 1603, 1604. In some cases, such as when the camera records more data (higher resolution) than what can be streamed, the recording is stored in local storage 1606. When the UAV lands in the dock it will take time to charge. During this time, the UAV can transfer the video data to the landing base computer 1654 via Wi-Fi or other communication method to be stored on the local storage 1655 or transferred through a network via fiber optic link 1656. In one embodiment, the landing base computer has a means for physical data connection, similar to the power connection.

Figure 17A:
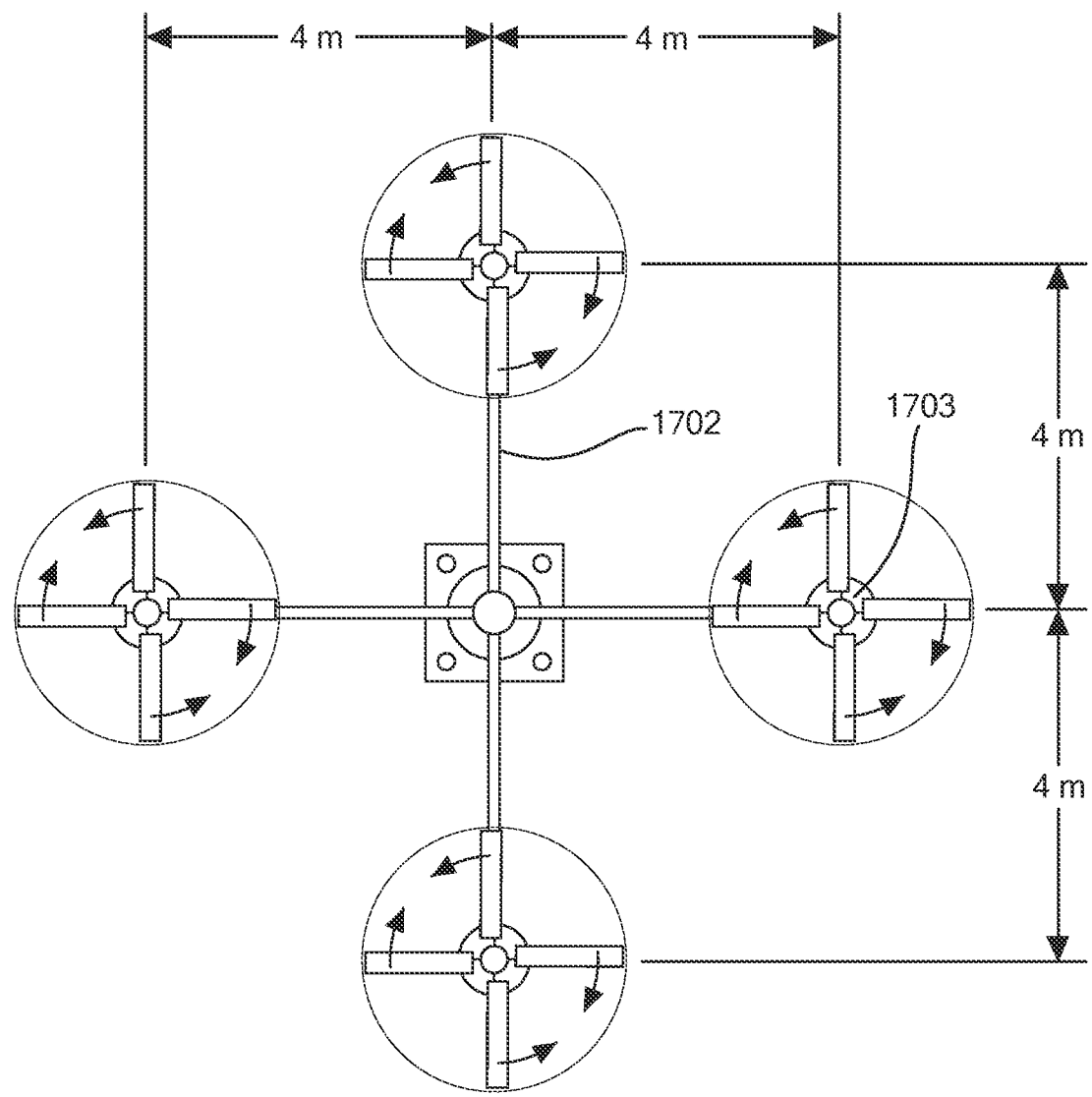
FIG. 17 is a diagram of an elevated cluster of landing bases, supported by a tower.
Figure 17B:
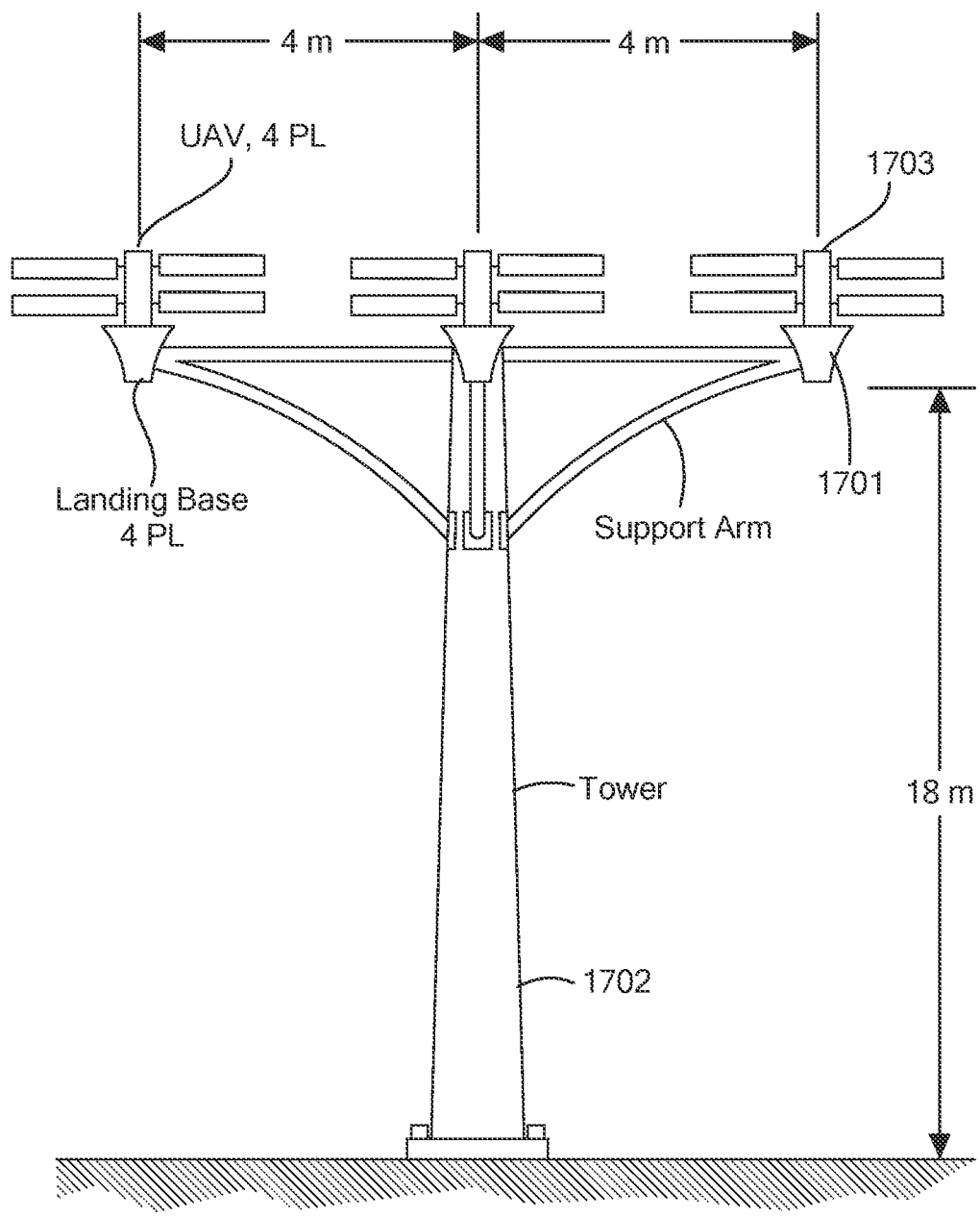

FIG. 17A illustrates a top down view of an elevated cluster of landing bases 1701, supported by a tower 1702. FIG. 17B is a side view of an elevated cluster of landing bases 1701, supported by a tower 1702. In one embodiment, the tower is similar to those used for cellular radio systems. The spacing of the landing bases allows adequate distance between UAVs 1703, such that two or more may be taking off or landing at the same time. Sharing a single tower, the cost of deploying a cluster of landing bases is minimized. The landing bases share an elevated structure for safe and secure operation, while also sharing the power and communication capabilities across the cluster.

What is claimed is:

1. An autonomous unmanned aerial vehicle, comprising:
   a body;
   a set of vertical lift rotors rotatably mounted to the body;
   a corresponding set of electric motors mounted to the body and coupled to the set of vertical lift rotors;
   a set of rechargeable battery modules mounted to the body and configured to electrically couple to the set of electric motors;
   a plurality of photodetectors; and
   a flight control system, comprising a precision landing receiver and a flight controller, the system configured to recognize a pulse sequence received by the plurality of photodetectors and distinguish the pulse sequence from ambient illumination;
   wherein the flight controller is coupled to the body, the set of electric motors, the set of vertical lift rotors, and the plurality of photodetectors, and comprising a processor and a memory storing instructions to cause the processor to:
      use the pulse sequence to estimate a current location of the autonomous unmanned aerial vehicle relative to a landing position; and
      based on the pulse sequence, cause operation of the set of electric motors and the set of vertical lift rotors to land the unmanned autonomous vehicle in proximity of the landing position.

2. The autonomous unmanned aerial vehicle of claim 1, further comprising:
   a landing peg, disposed beneath the body, the landing peg configured to enter a socket of a corresponding landing base;
   a set of vehicle-based electrical power connectors, disposed on the landing peg and electrically coupled to the set of rechargeable battery modules, and configured to transfer electrical power supplied by the corresponding landing base to the set of rechargeable battery modules.

3. The autonomous unmanned aerial vehicle of claim 2, wherein the landing peg is mechanically articulated for retraction into the body of the autonomous unmanned aerial vehicle.

4. A landing base for the autonomous unmanned aerial vehicle according to claim 2, comprising:
   a socket configured to receive the landing peg from the autonomous unmanned aerial vehicle, the socket comprising a land-based set of electrical power connectors configured to connect with the vehicle-based set of electrical power connectors and transfer electrical power from the landing base to the aerial vehicle when the landing peg from the autonomous unmanned aerial vehicle has been inserted into the socket;
   at least one roller configured to rotate and guide the landing peg further into the socket;
   an electrical power source coupled to the landing base; and
   a charge controller configured to control power transfer to the autonomous unmanned aerial vehicle in accordance with a stored charge profile appropriate for the set of battery modules.

5. The landing base of claim 4, further comprising a funnel-shaped entryway coupled to the socket and configured to guide the landing peg into the socket.

6. The autonomous unmanned aerial vehicle of claim 2, wherein an upper end of the landing peg includes-a tapered section configured to mate with a funnel shaped entryway of the socket of the corresponding landing base.

7. An autonomous unmanned aircraft system comprising:
   a plurality of aerial vehicles according to claim 2, wherein each autonomous unmanned aerial vehicle includes a wireless data transceiver coupled to the flight controller;
   a plurality of landing bases, each landing base having a socket configured to receive the landing peg from a selected one of the plurality of aerial vehicles; and
   a mission control system configured to communicate with the data transceiver of each of the aerial vehicles, so as to orchestrate the activities of the set of aerial vehicles.

8. The autonomous unmanned aircraft system according to claim 7, wherein (i) each of the plurality of autonomous unmanned aerial vehicles further includes a computer system configured for artificial intelligence processing and for implementing multi-party computing with the computer system of each of the other of the plurality of autonomous unmanned aerial vehicles, and (ii) the mission control system is implemented distributively via multi-party computing of the computer systems of the plurality of autonomous unmanned aerial vehicles.

9. The autonomous unmanned aerial vehicle according to claim 1, further comprising:
   a set of digital video cameras mounted to the body and covering a 360-degree field of view; and
   onboard circuitry, coupled to the set of digital video cameras, configured to compress and store the video data from the set of digital video cameras.

10. The landing base according to claim 4, wherein the autonomous unmanned aerial vehicle further includes:

a set of digital video cameras mounted to the body and covering a 360-degree field of view;

onboard circuitry, coupled to the set of cameras, configured to compress and store the store the video data from the set of cameras; and a video data transmitter;

and the landing base further comprises a video data receiver configured to receive video data from the video data transmitter.

11. The autonomous unmanned aerial vehicle of claim 2, wherein the vehicle-based electrical power connectors are configured to couple inductively to a set of land-based electrical power connectors disposed inside the socket of the landing base.

12. The landing base of claim 4, wherein the land-based electrical power connectors are configured to couple inductively to the vehicle-based electrical power connectors of the aerial vehicle.

13. The autonomous unmanned aircraft system according to claim 7, wherein the land-based electrical power connectors of each landing base are configured to couple inductively to the vehicle-based electrical power connectors of the autonomous unmanned aerial vehicle.

14. The autonomous unmanned aircraft system according to claim 7, wherein the mission control system is a ground-based computer system.

15. The autonomous unmanned aerial vehicle according to claim 2, wherein the vehicle-based electrical power connectors include a plurality of vehicle-based electrical contacts on the landing peg configured to connect to a corresponding plurality of land-based electrical contacts in the socket of the corresponding landing base.

16. The landing base according to claim 4, wherein the land-based electrical connectors includes a plurality of land-based electrical contacts inside the socket configured to make electrical connection with a corresponding plurality of vehicle-based contacts on the aerial vehicle.

17. The autonomous unmanned aerial vehicle of claim 1, wherein the plurality of photodetectors are mounted on the body and are configured to rotate with the body.

18. The autonomous unmanned aerial vehicle of claim 1, wherein the plurality of photodetectors are infrared photodetectors and include filters to reduce the reception of visible light energy.

19. The autonomous unmanned aerial vehicle of claim 1, wherein the pulse sequence is further indicative of a weather pattern, and the memory stores instructions to cause the processor to decode the pulse sequence and determine the weather pattern, and the step of causing operation of the set of electric motors and the set of vertical lift rotors to land the unmanned autonomous vehicle in proximity of the location of the landing position includes accounting for the weather pattern during the operation.

20. The autonomous unmanned aerial vehicle of claim 1, wherein the pulse sequence is further indicative of an availability of a landing base, and the memory stores instructions to cause the processor to decode the pulse sequence and determine the availability of the landing base, and the step of causing operation of the set of electric motors and the set of vertical lift rotors to land the unmanned autonomous vehicle in proximity of the location of the landing position includes delaying landing until the landing base is available.

21. The autonomous unmanned aerial vehicle of claim 2 wherein during a landing sequence the flight controller causes rotation of the landing peg, which causes rotation of a set of rollers in a corresponding landing base.

22. The autonomous unmanned aerial vehicle of claim 1 wherein the pulse sequence is an infrared pulse sequence.

23. The autonomous unmanned aerial vehicle of claim 1, wherein each photodetector of the plurality of photodetectors has a sensitivity that varies as a function of the angle of incidence of incoming light, and at least two of the photodetectors are disposed at distinct angular orientations relative to the body.

24. A landing base for the autonomous unmanned aerial vehicle according to claim 1, comprising a plurality of optical emitters, disposed in a pattern surrounding a landing position, configured to emit light in a pulse sequence.

25. The autonomous unmanned aerial vehicle of claim 1, wherein the memory further stores instructions to cause the processor to distinguish the pulse sequence from ambient illumination.

26. The autonomous unmanned aerial vehicle of claim 1, wherein the precision landing receiver is configured to distinguish the pulse sequence from ambient illumination.

* * * * *